(12) United States Patent
Holland et al.

(10) Patent No.: US 10,762,578 B2
(45) Date of Patent: Sep. 1, 2020

(54) SINGLE AUDIT TOOL

(71) Applicant: Thomson Reuters Enterprise Centre GmbH, Zug (CH)

(72) Inventors: Stephen Edward Holland, River Oaks, TX (US); Lee Scott Spradling, Fort Worth, TX (US); Stephen W. Lindsey, Fort Worth, TX (US)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 311 days.

(21) Appl. No.: 14/792,652

(22) Filed: Jul. 7, 2015

(65) Prior Publication Data

US 2015/0310563 A1    Oct. 29, 2015

Related U.S. Application Data

(63) Continuation of application No. 12/949,176, filed on Nov. 18, 2010, now abandoned.

(60) Provisional application No. 61/387,166, filed on Sep. 28, 2010.

(51) Int. Cl.
  *G06Q 40/00* (2012.01)
  *G06Q 30/00* (2012.01)
  *G06Q 50/26* (2012.01)

(52) U.S. Cl.
  CPC .......... *G06Q 40/12* (2013.12); *G06Q 30/018* (2013.01); *G06Q 40/00* (2013.01); *G06Q 50/26* (2013.01)

(58) Field of Classification Search
  None
  See application file for complete search history.

(56) References Cited

U.S. PATENT DOCUMENTS

2009/0112741 A1*  4/2009  Kershner .............. G06Q 40/12
                                                                    705/30
2009/0240606 A1   9/2009  Oakman et al.

OTHER PUBLICATIONS

NPL_A-133 Compliance Supplement, Mar. 2006, downloaded from http://georgebush-whitehouse_archives.gov/omb/circulars/a133_compliance/06/06toc.html on Mar. 2, 2013, 116 pages.*
NPL_Single_Audit, Definition of Single Audit, downloaded Apr. 22, 2013 from http://en.wikipedia.org/wiki/Sincle_Audit, 9 pages.*
NPL_Audit, downloaded from https://georgewbush-whitehouse.archives.gov/omb/circulars/a133_Compliance/06/doi.pdf, 29 pages downloaded on Feb. 27, 2019. (Year: 2003).*
NPL A-133 Compliance Supplement.pdf, downloaded from https://georgewbush-whitehouse.archives.gov/omb/circulars/a133_compliance/06/06toc.html, 2 pages downloaded on Feb. 25, 2019. (Year: 2006).*
NPL_Part4_indian, downloaded from https://georgewbush-whitehouse.archives.gov/omb/circulars/a133_compliance/06/06toc.html, 2 pages downloaded on Feb. 25, 2019. (Year: 2006).*
NPL Audit, downloaded from https://georgewbush-whitehouse.archives.gov/omb/circulars/a133_Compliance/06/doi.pdf, 29 pages downloaded on Feb. 27, 2019. (Year: 2003) (Year: 2003).*

(Continued)

*Primary Examiner* — Paul Danneman
(74) *Attorney, Agent, or Firm* — Thomson Reuters

(57) ABSTRACT

Systems and techniques are disclosed for planning and performing an audit. The systems and techniques determine whether a Single Audit or a program-specific audit is to be performed for an entity, and automatically select one or more compliance procedures that are to be used during the auditing process.

41 Claims, 25 Drawing Sheets

(56) References Cited

OTHER PUBLICATIONS

NPL A-133 Compliance Supplement.pdf, downloaded from https://georgewbush-whitehouse.archives.gov/omb/circulars/a133_compliance/06/06toc.html, 2 pages downloaded on Feb. 25, 2019. (Year: 2006) (Year: 2006).*
NPL_Cluster_of_Programs_pt5.pdf, downloaded from https://georgewbush-whitehouse.archives.gov/omb/circulars/a133_compliance/06/pt5.pdf, 47 pages on Nov. 7, 2014.
NPL_Audit, OMB A-133 Compliance Supplement, Mar. 2006, downloaded from http://georgewbush-whitehouse.archives.gov/omb/a133_compliance06/06toc.html on Mar. 2, 2013, 116 pages.
Wiki_Single Audit, Definition of Single Audit, downloaded Apr. 22, 2013 from http://en.wikipedia.org/wiki/Single_Audit, 9 pages.

* cited by examiner

FIG. 3

Engagement Setup

Select Database:
(local) — Browse

Client Details:
Enter the client name:
City of Example

Type of Entity:
Local Government/Local Education Agency/Indian Tribal Government Does the client qualify as an institution of higher education?  ○ Yes  ● No — 76

Enter a name for the engagement:
Sample Engagement

Enter the fiscal year end for the period under audit (mm/dd/yy):
12/31/2010 — 68

Select the Compliance Supplement you wish to use with this engagement:
June 2010 Compliance Supplement issued for fiscal years beginning after 6/30/2009 Version 1.0 (suggested)

Finish    Cancel

Financial Awards Summary

| Agency or Department | CFDA or Other No. | Name of Program | Name of Grant | Grant I.D. No. | Award Amount | Total Awards Expended | Loan or Loan Guarantee Program? | Last Year Audited as a Major Program |
|---|---|---|---|---|---|---|---|---|

Figure 12:
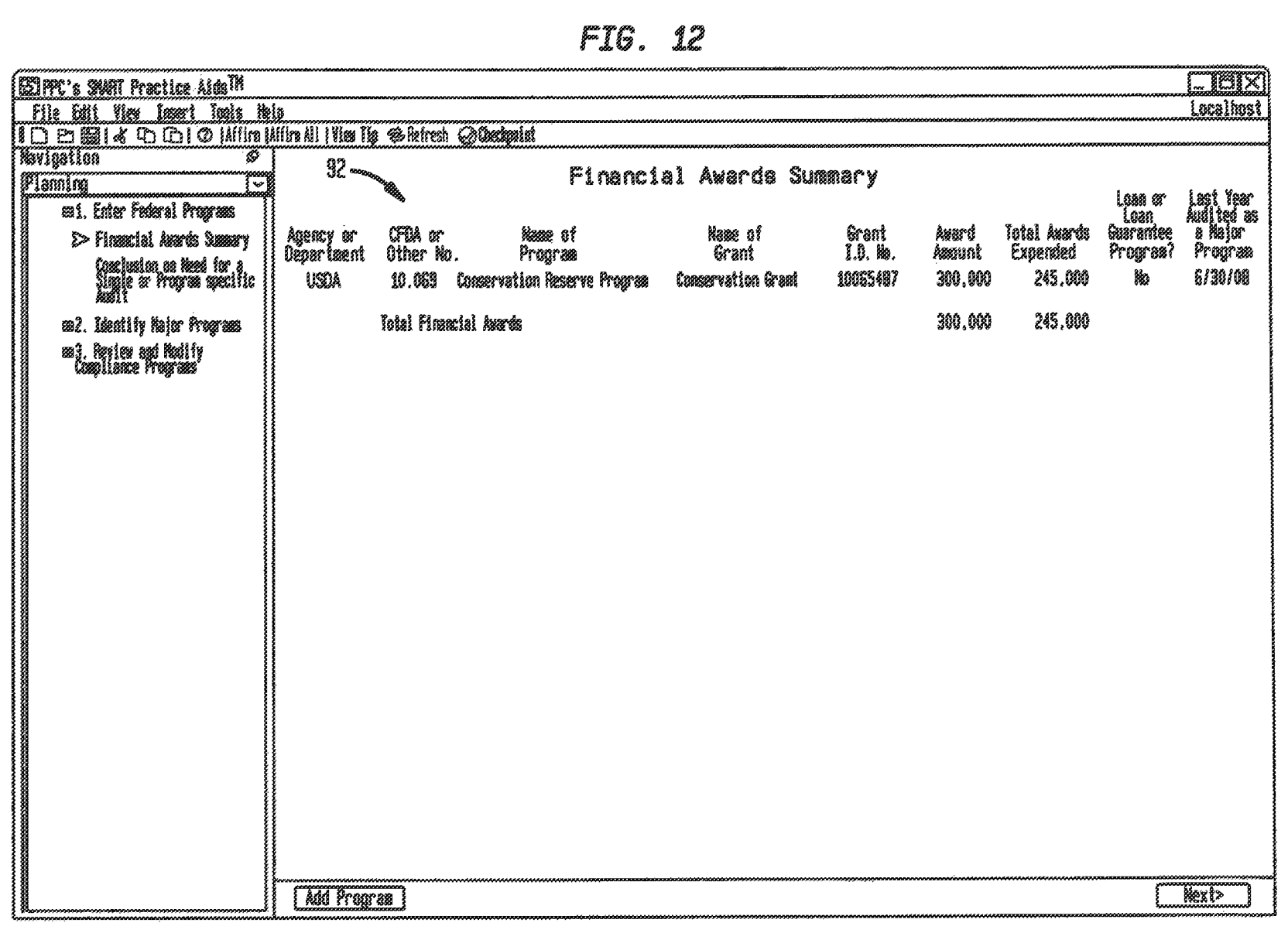

Financial Awards Summary

| Agency or Department | CFDA or Other No. | Name of Program | Name of Grant | Grant I.D. No. | Award Amount | Total Awards Expended | Loan or Loan Guarantee Program? | Last Year Audited as a Major Program |
|---|---|---|---|---|---|---|---|---|
| USDA | 10.069 | Conservation Reserve Program | Conservation Grant | 10065497 | 300,000 | 245,000 | No | 6/30/08 |
| Total Financial Awards | | | | | 300,000 | 245,000 | | |

Planning:
- 1. Enter Federal Programs
  - ▷ Financial Awards Summary
  - Conclusion on Need for a State or Program specific Audit
- 2. Identify Major Programs
- 3. Review and Modify Compliance Programs

FIG. 13

Financial Awards Summary

| Agency or Department | CFDA or Other No. | Name of Program | Name of Grant | Grant I.D. No. | Award Amount | Total Awards Expended | Loan or Loan Guarantee Program? | Last Year Audited as a Major Program |
|---|---|---|---|---|---|---|---|---|
| USDA | 10.069 | Conservation Reserve Program | Conservation Grant | 10063407 | 300,000 | 245,000 | No | 6/30/08 |
| USDA | | Rural Rental Housing Cluster | | | | | | |
| USDA | 10.415 | Rural Rental Housing Loans | Housing Grant | 22345 | 500,000 | 376,466 | No | |
| USDA | 10.427 | Rural Rental Assistance Payments | Assistance Grant | 235468 | 1,000,000 | 465,200 | No | 6/30/08 |
| | | Total Rural Rental Housing Cluster | | | 1,500,000 | 841,666 | | |
| USDA | 10.553 | School Breakfast Program | Breakfast Grant | 00457 | 65,000 | 65,000 | No | |
| USDA | 10.569 | Emergency Food Assistance | Food Assistance Grant | 103457 | 435,000 | 360,974 | No | |
| DOL | 17.207 | Employment Service | Employment Grant | 0004567 | 275,000 | 183,000 | No | |
| | | Total Financial Awards | | | 2,375,000 | 1,695,640 | | |

High Risk Type B Selection

You assessed the Type B programs below as having a high risk of noncompliance. Under Option 1, you must audit as major programs at least one-half of these programs, but not less than the number of low risk Type A programs.

Select at least 2 of the programs below as major programs, giving preference to ARRA funded programs.

High Risk Type B Programs

| Agency or Department | CFDA or Other | Name of Program or Cluster | Total Amount Expended ($) | Risk Level | Last Year Audited as a Major Program | Major Program |
|---|---|---|---|---|---|---|
| DOI | 15.052 | Undesirable/Noxious Plant Species | 220,000 | High | | ☐ |
| DOS | 19.019 | International Program to Combat Human Trafficking | 185,000 | High | | ☐ |
| GSA | 39.007 | Sale of Federal Surplus Personal Property | 220,000 | High | | ☒ |
| EPA | 66.708 | Multi-Media Capacity Building Grants for States and Tribes | 245,000 | High | | ☐ |
| Total Awards | | | 870,000 | | | |

SINGLE AUDIT TOOL

CROSS-REFERENCE TO RELATED APPLICATIONS

This application is a continuation of U.S. patent application Ser. No. 12/949,176, filed on Nov. 18, 2010, which claims priority to U.S. Provisional Application 61/387,166 filed on Sep. 28, 2010, the contents of which are incorporated herein in its entirety.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials. The following notice applies to this document: Copyright © 2015 Thomson Reuters.

TECHNICAL FIELD

The present invention relates to the provision of and tools to assist in the provision of professional services, and more particularly, to computer-implemented tools, resources, and processes for planning and executing a Single Audit.

BACKGROUND

Single Audit is an organization-wide examination of an entity that receives funds (typically federal funds) over a period of time. The Single Audit provides assurance to a granting institution that funds awarded to entities, such as states, cities, universities, and non-profit organizations, are being managed and used according to applicable laws, regulations, contracts, and grant agreements.

Typically, the Single Audit is performed by an independent certified public accountant (CPA) and includes two main parts: an audit of the financial statements and a compliance audit of the entity's funding programs. The compliance audit of the funding programs includes (a) gaining an understanding of and testing internal controls over compliance and (b) testing compliance with applicable compliance requirements for major programs, and includes a planning stage and an examining stage. The compliance audit of award programs is integrated with the audit of the entity's financial statements.

A planning stage of the compliance audit of funding programs requires an auditor to familiarize himself/herself with the management and operation of the entity. Typically, the auditor identifies any funding awards received by the entity and determines whether there is a high or low risk that the entity does not comply with laws and regulations. As various funds are provided each year to different entities, each with their own style of management and operation, and as each awarded fund can include different laws and regulations relating to fund use by the entity, the structure of Single Audits tends to differ from one entity to another entity.

Accordingly, improved systems and techniques are needed to plan and perform audits that are based on qualities and characteristics of an entity in addition to rules and procedures associated with granted funds.

SUMMARY

Systems and techniques are disclosed for planning and performing a compliance audit of funding programs. The systems and techniques determine whether a Single Audit or a program-specific audit is to be performed for an entity, and automatically select or enable selection of one or more compliance procedures that are to be used during the auditing process.

For example, according to one aspect, a computer-implemented method for planning an audit includes determining whether a Single Audit or a program-specific audit is to be performed for an entity based at least in part on a received financial award associated with a funding program and entity-specific information. The method includes determining whether the funding program is to be evaluated as a major program by assessing risk and coverage information associated with the financial award, and selecting automatically or enabling selection of at least one compliance procedure to be used during the Single Audit or the program-specific audit. The method also includes providing the at least one compliance procedure to conduct the Single Audit or the program-specific audit.

In one embodiment, the method further includes conducting the Single Audit or the program-specific audit. The entity-specific information can include information describing the type of entity. For example, in one embodiment, the type of entity is one of a "Local Government", "Local Education Agency", "Indian Tribal Government", "State Government", "State Education Agency", "Nonprofit Organization", or combination thereof.

In another embodiment, the method includes aggregating a plurality of funding programs into a grouping based on a similarity characteristic associated with each of the plurality of funding programs, and selecting automatically or enabling selection of at least one compliance procedure based at least in part on the grouping.

In yet another embodiment, the method includes customizing the at least one compliance procedure. Customizing the compliance procedure can includes adding, deleting, and/or modifying a procedure automatically selected by the system or user.

In a further embodiment, a method for planning an audit for an entity is disclosed. The method is carried out under the control of one or more computer systems configured with executable instructions. The method includes determining, using an engagement module of a web server, an audit risk level for the entity and determining, using a program module of the web server, whether a Single Audit of the entity is to be performed based at least in part on a financial award received by the entity exceeding a first threshold value and on first information, wherein the financial award is associated with at least one funding program and the first information includes information specific to the entity and to the at least one funding program, wherein said information specific to the entity is determined from one or more user responses to a first set of questions provided through a graphical user interface. If the financial award received by the entity does not exceed the first threshold level, determining, using the program module of the web server, whether a program-specific audit is to be performed for the entity based at least on second information related to the at least one funding program. The method also includes determining, using the program module of the web server, whether the at least one funding program is to be evaluated as a major program at least in part by assessing risk and coverage information associated with the financial award and the entity, said determining of the at least one funding program as a major program further comprising automatically determining whether the at least one funding program can be clustered into a grouping of funding programs and processed as a single funding program based at least in part on whether a set of common compliance requirements can be applied to the at least one funding program wherein said risk and coverage information is determined from one or more user responses to a second set of questions provided through a graphical user interface. The method further includes automatically determining, using a compliance module of the web server, at least one compliance procedure from a plurality of compliance procedures for use during the Single Audit or the program-specific audit, said determining of the at least one compliance procedure for use based on at least the determined audit risk level and the determined funding program evaluation and providing the at least one compliance procedure to conduct the Single Audit or the program-specific audit.

A system, as well as articles that include a machine-readable medium storing machine-readable instructions for implementing the various techniques, are disclosed. Details of various implementations are discussed in greater detail below.

Additional features and advantages will be readily apparent from the following detailed description, the accompanying drawings and the claims.

BRIEF DESCRIPTION OF THE DRAWINGS

FIGS. 3-6 illustrate an exemplary graphical user interface for establishing a Single Audit for an entity;

FIGS. 7-15 illustrate an exemplary graphical user interface for determining whether a Single Audit is required for an entity;

FIGS. 16-21 illustrate an exemplary graphical user interface for assessing risk and coverage information associated with a funding program;

FIGS. 22-23 illustrate an exemplary graphical user interface for displaying a compliance program.

FIG. 25 illustrates an exemplary graphical user interface for assessing Type B programs.

Like reference symbols in the various drawings indicate like elements.

DETAILED DESCRIPTION

Figure 1:
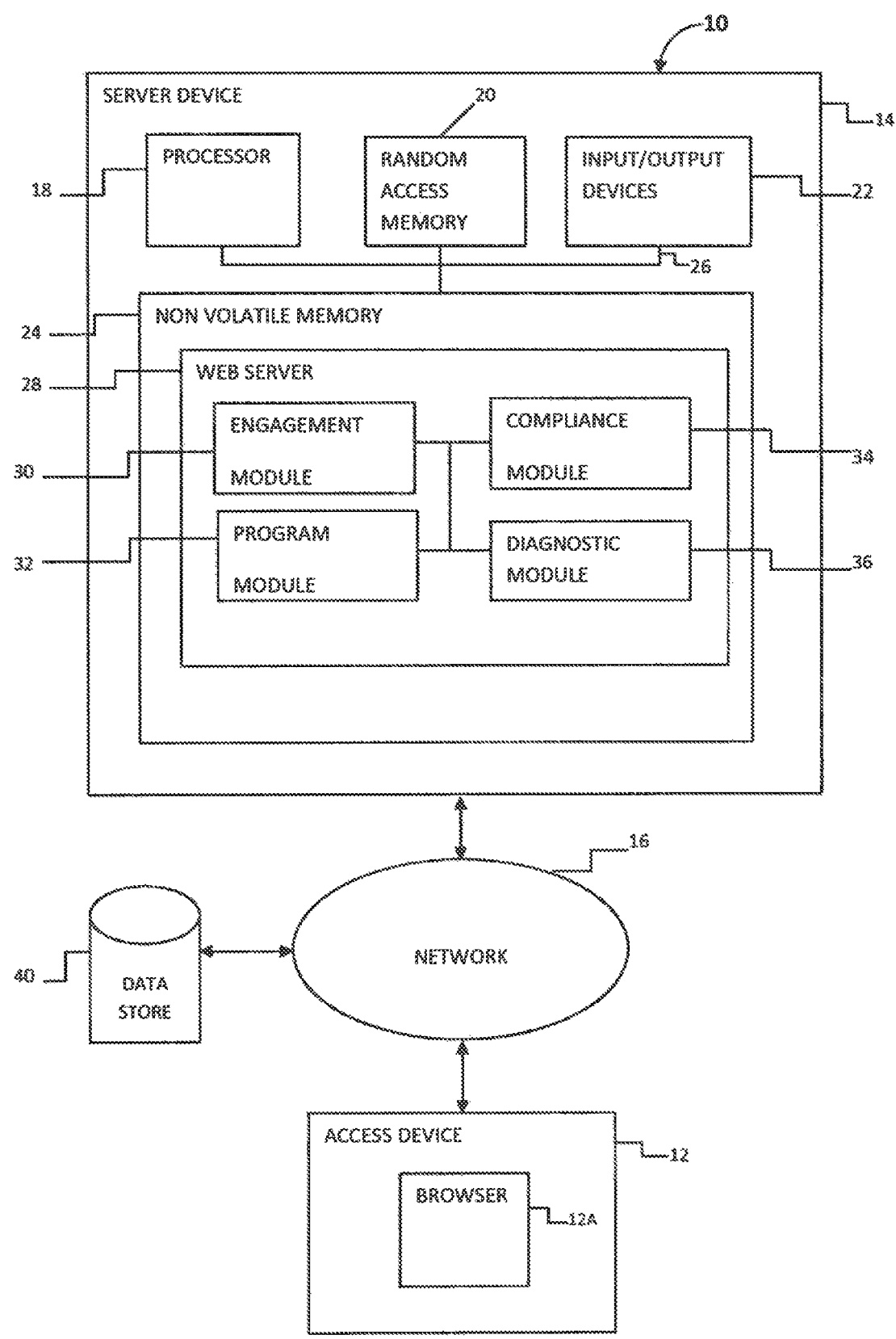
FIG. 1 is a schematic of an exemplary computer-based Single Audit system.

FIG. 1 shows an exemplary computer-based system 10 for planning and performing a Single Audit. A 'Single Audit' refers to an organization-wide examination of an entity, such as a local government, local education agency, Indian tribal government, state government, state education agency, or non-profit organization, to ensure that funds received by the entity are expended, managed and controlled according to specific rules and regulations. For example, in one embodiment, the system 10 is configured to provide assurances to the U.S. Federal Government that funds expended by an entity are managed and used in accordance with the Single Audit Act of 1997, and regulations described in the Office of Management and Budget's (OMB) Circular A-133, Audits of State and Local Governments and Non-Profit Organizations.

As shown in FIG. 1, in one embodiment, the system 10 is configured to include an access device 12 that is in communication with a server 14 over a network 16. The access device 12 can include a personal computer, laptop computer, or other type of electronic device, such as a cellular phone or Personal Digital Assistant (PDA). The access device 12 is coupled to I/O devices (not shown) and includes a keyboard in combination with a pointing device such as a mouse for sending web page requests to the server 14. Preferably, memory of the access device 12 is configured to include a browser 12A that is used to request and receive information from the server 14. Although only one access device 12 is shown in FIG. 1, the system 10 can support multiple access devices.

The network 16 can include various devices such as routers, servers, and switching elements connected in an Intranet, Extranet or Internet configuration. In some implementations, the network 16 uses wired communications to transfer information between the access device 12 and the server 14. In another embodiment, the network 16 employs wireless communication protocols. In yet other embodiments, the network 16 employs a combination of wired and wireless technologies.

As shown in FIG. 1, in one embodiment, the server device 14 includes a processor 18, such as a central processing unit ('CPU'), random access memory ('RAM') 20, input-output devices 22, such as a display device (not shown) and keyboard (not shown), and non-volatile memory 24, all of which are interconnected via a common bus 26 and controlled by the processor 18. As shown in the FIG. 1 example, the non-volatile memory 24 is configured to include a web server 28 for processing requests from the access device 12.

The web server 28 is configured to send requested web pages to the browser 12A of the access device 12. The web server 28 communicates with the web browser 12A using one or more communication protocols, such as HTTP (Hyper Text Markup Language). In one embodiment, the web server 28 is configured to include the Java 2 Platform, Enterprise Edition ('J2EE') for providing a plurality of displays on the browser 12A.

The web server 28 provides a run-time environment that includes software modules that guide a user (e.g., an auditor) through a planning and examining stage of the Single Audit. The software modules determine whether a Single Audit is required for an entity and whether one or more programs associated with received funds of the entity are to be considered a "major program," which would require specific testing during the Single Audit. As used herein, the phrase "major program" refers to a federal award program that receives more focused audit procedures during the Single Audit based on completion of a risk assessment process. Further, one or more software modules are configured to automatically select or enable selection of compliance procedures that are to be used during performance of the Single Audit, and to generate compliance checklists and worksheets for groups or clusters of funding programs to enable more efficient auditing.

For example, in one embodiment, as shown in FIG. 1, the run-time environment includes the following software modules: an engagement module 30 to establish an audit engagement, a program module 32 to determine whether a Single Audit or program-specific audit is to be performed and to assess risk and coverage information associated with a funding program, a compliance module 34 to automatically select or enable selection of compliance procedures to be used during the audit, and a diagnostic module 36 to detect errors and/or inconsistencies during planning of the audit. Details of the software modules 30, 32, 34, 36 configured in the run-time environment are discussed in further detail below.

A data store 40 is provided that is utilized by software modules 30, 32, 34, 36 to access and store information relating to the Single Audit. In one embodiment, the data store 40 is a relational database. In another embodiment, the data store 40 is a directory server, such as a Lightweight Directory Access Protocol ('LDAP') server. In yet other embodiments, the data store 40 is a configured area in the non-volatile memory 24 of the device server 14. Although the data store 40 shown in FIG. 1 is connected to the network 16, it will be appreciated by one skilled in the art that the data store 40 can be distributed across various servers and be accessible to the server 14 over the network 16, or alternatively, coupled directly to the server 14, or be configured in an area of non-volatile memory 24 of the server 14, or be functionally provided by other physical arrangements.

It should be noted that the system 10 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input is communicated to the computing device via an input device, such as a keyboard and/or mouse. Data output of the system is communicated from the computing device to a display device, such as a computer monitor.

Figure 2:
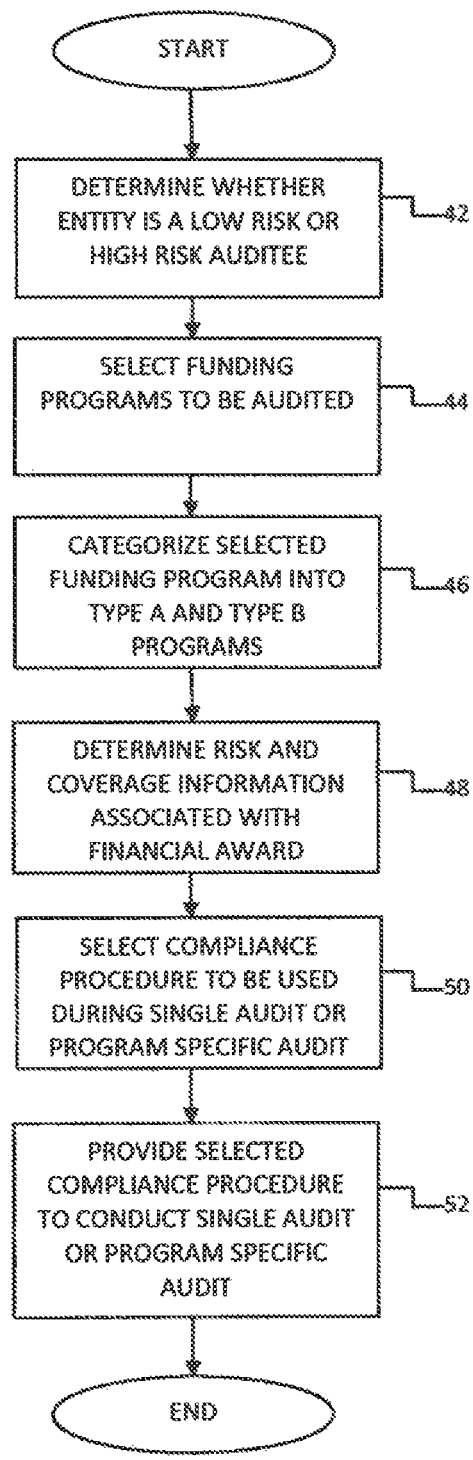
FIG. 2 is an exemplary method of planning and conducting a Single Audit.

Turning now to FIG. 2, an exemplary method of planning an audit according to one embodiment of the invention is disclosed. As shown in the FIG. 2 example, first, the engagement module 30 determines whether an entity is to be considered a low risk or a high risk entity 42. The engagement module 30 determines a risk level for an entity by evaluating user responses to a set of provided questions with a set of predefined rules and regulations associated with funding programs. An example set of questions provided by the engagement module 30 are shown in connection with FIGS. 4-6.

Next, the program module 32 determines which of any funding programs associated with received funds are to be audited 44. In one embodiment, this step includes identifying any federal assistance expended by the entity during one year by federal program name, federal agency and Catalog of Federal Domestic Assistance (CFDA) number. The program module 32 then combines these expenditures to determine the total amount expended during the year. For example, in one embodiment, the program module 32 determines that a Single Audit is required for an entity if total federal expenditures during a year equal or exceed five hundred thousand dollars ($500,000). If the entity does not meet this threshold, the program module 32 determines that a Single Audit is not required. In one embodiment, if the program module 32 determines that a Single Audit is not required, the user may elect to perform a program-specific audit, which is generally allowed when an entity expends Federal awards under only one federal program and the federal program's laws, regulations, or grant agreements do not require a financial statement audit, without auditing the entire entity.

As shown in FIG. 2, once the program module 32 determines which funding programs are to be audited, the program module 32 then categorizes identified funding programs into either 'Type A' programs or 'Type B' programs 46. In one embodiment, a 'Type A' program is determined by the program module 32 to be any funding program which an entity expends either: (1) $300,000 or more of federal assistance for recipients with $10 million or less of expended federal assistance during the audit period, or (2) 3% of the total federal assistance expended during the year for those who exceed $10 million, whichever is greater. In one embodiment, for example, a 'Type A' program is a large federal award program as determined by an amount of annual expenditures that exceed a minimum of $300,000 or a maximum of 0.15% of expenditures according to a graduated scale based on total expenditures. In certain instances, 'Type A' programs are assessed as being low risk or not low risk.

A 'Type B' program is determined by the program module 32 to be any single program which does not meet the Type A requirements. In particular, in one embodiment, a 'Type B' program is a small federal award program as determined by an amount of annual expenditures that do not exceed a minimum of $300,000 or a maximum of 0.15% of expenditures according to a graduated scale based on total expenditures. In certain instances, Type B programs are assessed as being high risk or not high risk. Details of determining and categorizing funding programs are discussed in connection with FIGS. 7-15.

Once funding programs are categorized, the program module 32 then assesses risk and coverage information associated with funds received and expended by the entity 48. In one embodiment, the program module 32 is based on OMB Circular A-133 which requires the user to study and understand the operations and internal controls of programs within the entity, and perform and document a risk assessment based on such study to determine whether each program has either a high or low risk of not complying with laws and regulations. OMB Circular A-133 used by the system 10 allows the user to consider numerous factors including current and prior audit experience, good or poor internal controls over federal programs, many or no prior audit findings, continuous or lack of oversight exercised by the federal government over the recipient, evidence or knowledge of fraud, as well as inherent risk of the federal program.

In one embodiment, for any Type A program considered to have a risk of not complying that is not low, the program module 32 requires the user to perform a compliance audit on that program. For a Type A program that is considered to be of low risk, the program module 32 does not require the user to perform a compliance audit, but rather allows the user to indicate whether an audit is to be performed on the funding program to meet other requirements such as the percentage of coverage requirement. In one embodiment, the program module 32 enforces at least two requirements for a funding program to be considered low risk. First, the funding program needs to have been audited at least once in the last two years, and second, the funding program needs to have no audit findings when it was last audited. If the funding program does not comply with either of these two requirements, the program module 32 automatically considers the program not low risk.

For Type B programs which have been identified as high-risk, the program module 32 provides the user with two options: either audit half of all high-risk Type B programs, or audit one Type B high-risk program for every low-risk Type A program. Type B programs which do not have a high risk of not complying are not required to be audited. Details of assessing risk and coverage associated with funding programs are discussed in connection with FIGS. 16-21.

Referring to FIG. 2, once risk and coverage information associated with funding programs is determined, the compliance module 34 automatically selects (if the award is specifically included in the Compliance Supplement) or automatically enables selection (if the award is not specifically in the Compliance Supplement) of one or more compliance procedures to be used during the Single Audit or program-specific audit 50 and provides the same to the user in response to a request 52. Exemplary compliance procedures generated by the compliance module 34 are shown in connection with FIGS. 22-23. FIG. 24 illustrates additional information provided by functionality of the diagnostic module 36.

Turning now to FIG. 3, an example engagement setup screen 60 provided by the engagement module 30 is shown. The engagement setup screen 60 includes a database-selection area 62 to select a data store for storing audit information, and an entity-details area 64. The entity-details area 64 allows the user to specify an entity-name 72, entity-type information 74, and whether the entity qualifies as an institution of higher education 76. Entity-type information can include, but is not limited to, a 'Local Government', 'Local Education Agency', 'Indian Tribal Government', 'State Government', 'State Education Agency', 'Nonprofit Organization', or combinations thereof. In one embodiment, as shown in FIG. 3, the engagement setup screen 60 includes an engagement-name area 66 for identifying a name for the audit, an audit-date field 68 for entering a fiscal year-end for the period under audit, and a compliance-supplement section 70 for selecting a Compliance Supplement to be used during a Single Audit.

The Compliance Supplement includes information regarding laws and regulations (e.g., compliance requirements) for selected funding programs provided by the U.S. Federal Government. OMB Circular A-133 specifies a set of requirements that an entity must meet to be considered a low-risk entity which have been coded into the system. These requirements can include determining whether a Single Audit has been performed for the entity on an annual basis in prior years, determining whether there are any unqualified auditor opinions on financial statements and/or Schedule of Federal Expenditures, whether there are significant deficiencies or material weaknesses identified in prior audits, as well as whether federal programs previously audited had audit findings (e.g., one or more deficiencies identified during an audit) in the last two years.

As shown the FIG. 3 example, in one embodiment, a user-selectable hyperlink 78A is provided that allows the user to select a Compliance Supplement to use during the audit. Upon the user selecting the hyperlink 78A, the engagement module 30 displays a user selectable list of Compliance Supplements (not shown) that can be used during the examining stage of a Single Audit.

Advantageously, the engagement module 30 is configured to recommend which one of a plurality of user-selectable Compliance Supplements should be selected for the audit. In one embodiment, the selection is based on the beginning of the fiscal year corresponding to the fiscal year and date entered by the user. In various embodiments, however, the engagement module 30 allows the user to override this selection and select a different Compliance Supplement, if desired.

Upon the user selecting the finish button 78A, the engagement module 30 creates the engagement and stores the same in the data store specified in the database selection area 62. User selection of the cancel button 78B terminates execution of the engagement setup screen 60.

Figure 4:
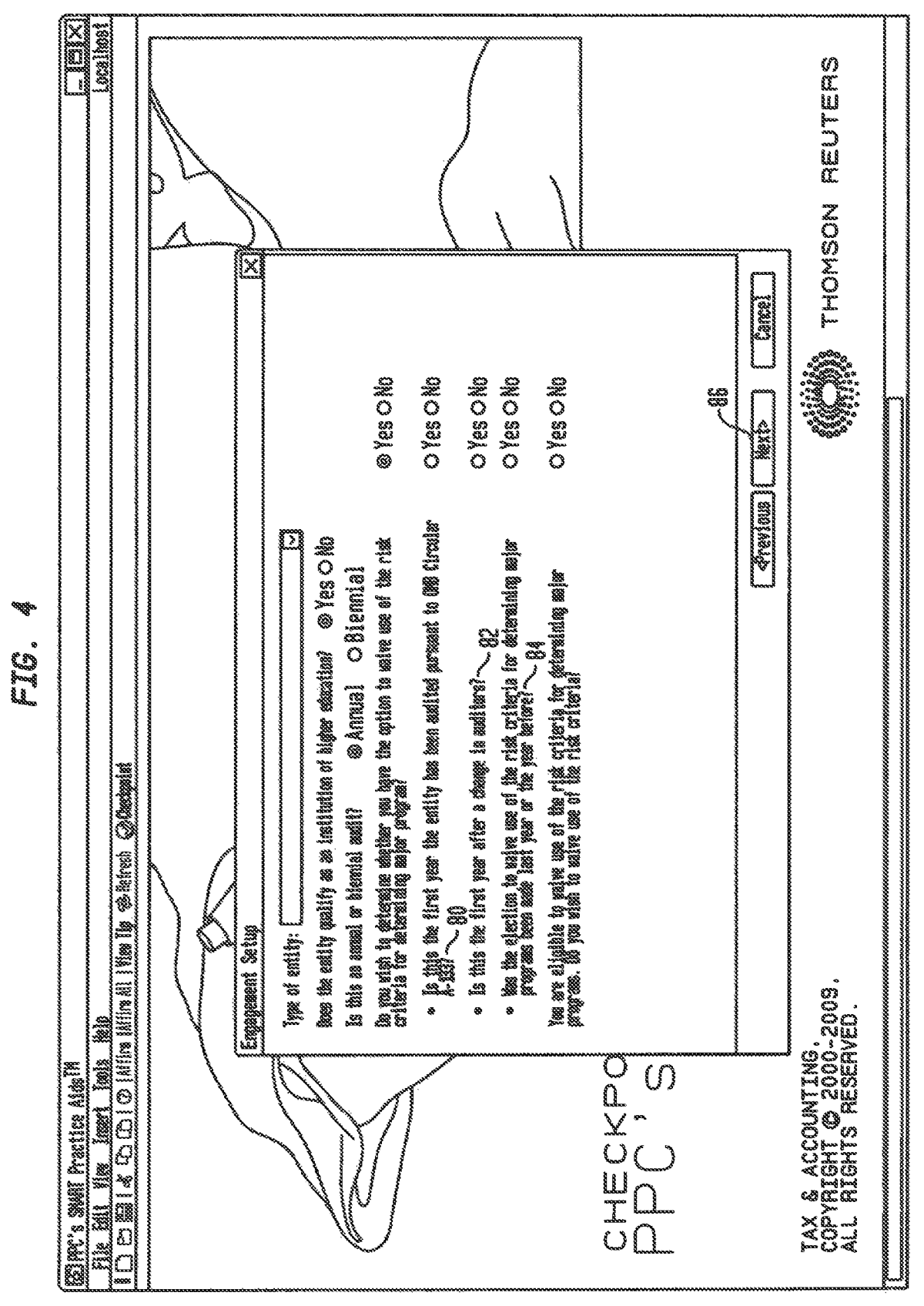

Turning now to FIG. 4, in one embodiment, the engagement module 30 provides the user with a set of questions, the responses to which determine whether the entity is a low risk entity or not a low risk entity. As shown in the FIG. 4 example, the user is presented with a question as to whether the user has the option to waive use of risk criteria for determining major programs. If the user responds 'Yes', the engagement module 30 displays the first bulleted question 80 shown in FIG. 4. Succeeding questions are then displayed only if relevant. That is, if the response to the first bulleted question 80 is 'No', the engagement module 30 displays the second bulleted question 82 shown in FIG. 4. Otherwise, if the response to the first bulleted question 80 is 'Yes', the second bulleted question 82 is not displayed and the engagement module 30 displays the third bulleted question 84. Based on a response to the above-questions 80, 82, 84, the engagement module 32 determines whether the entity is eligible to waive use of the risk criteria for major program determination and, based on the determination, queries the user as to whether the user wishes to waive use of the risk criteria. Upon selection of the next button 86, the engagement module 32 provides an additional set of questions to the user, as shown in FIGS. 5 and 6.

Figure 5:
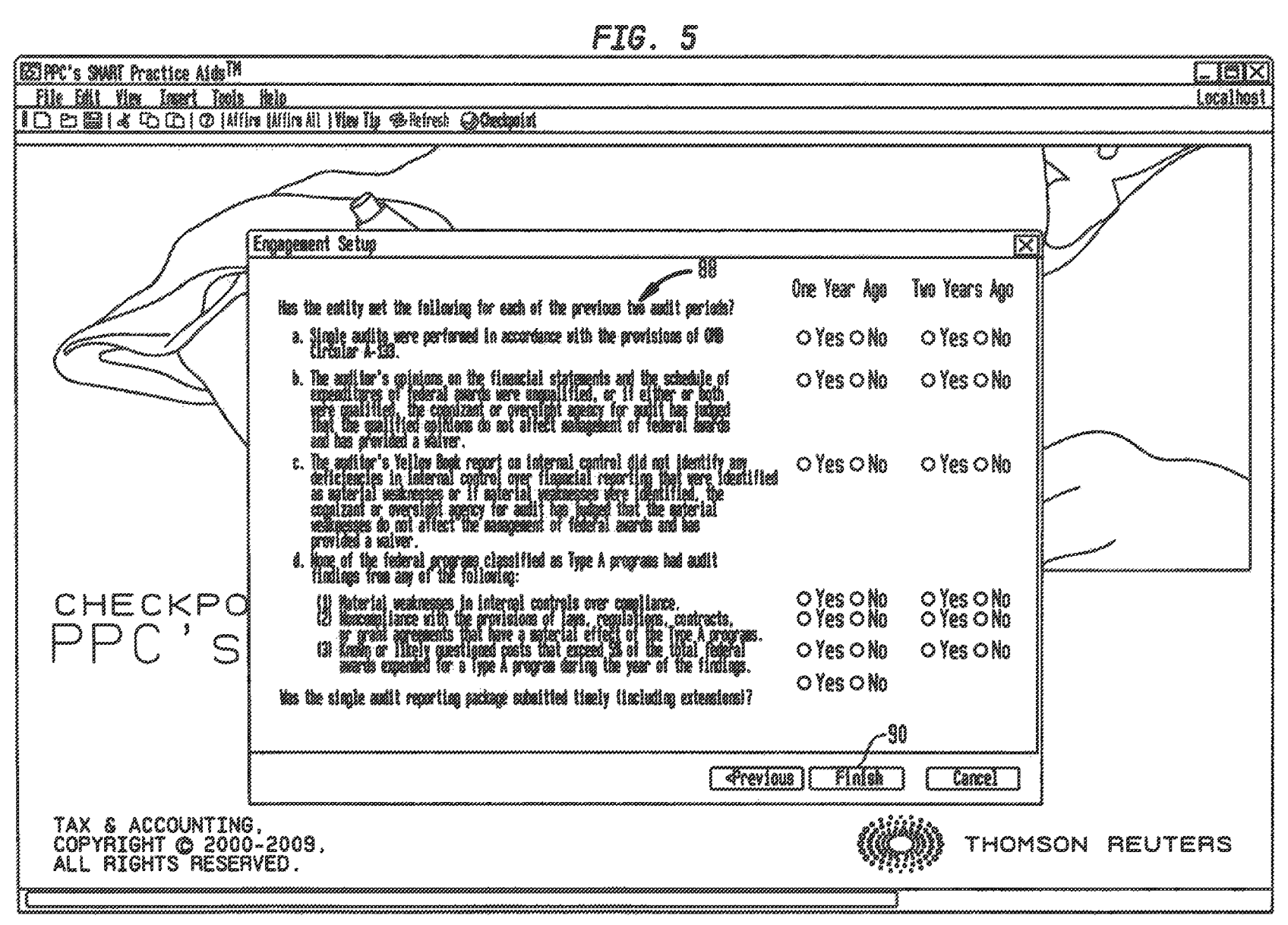
Figure 6:
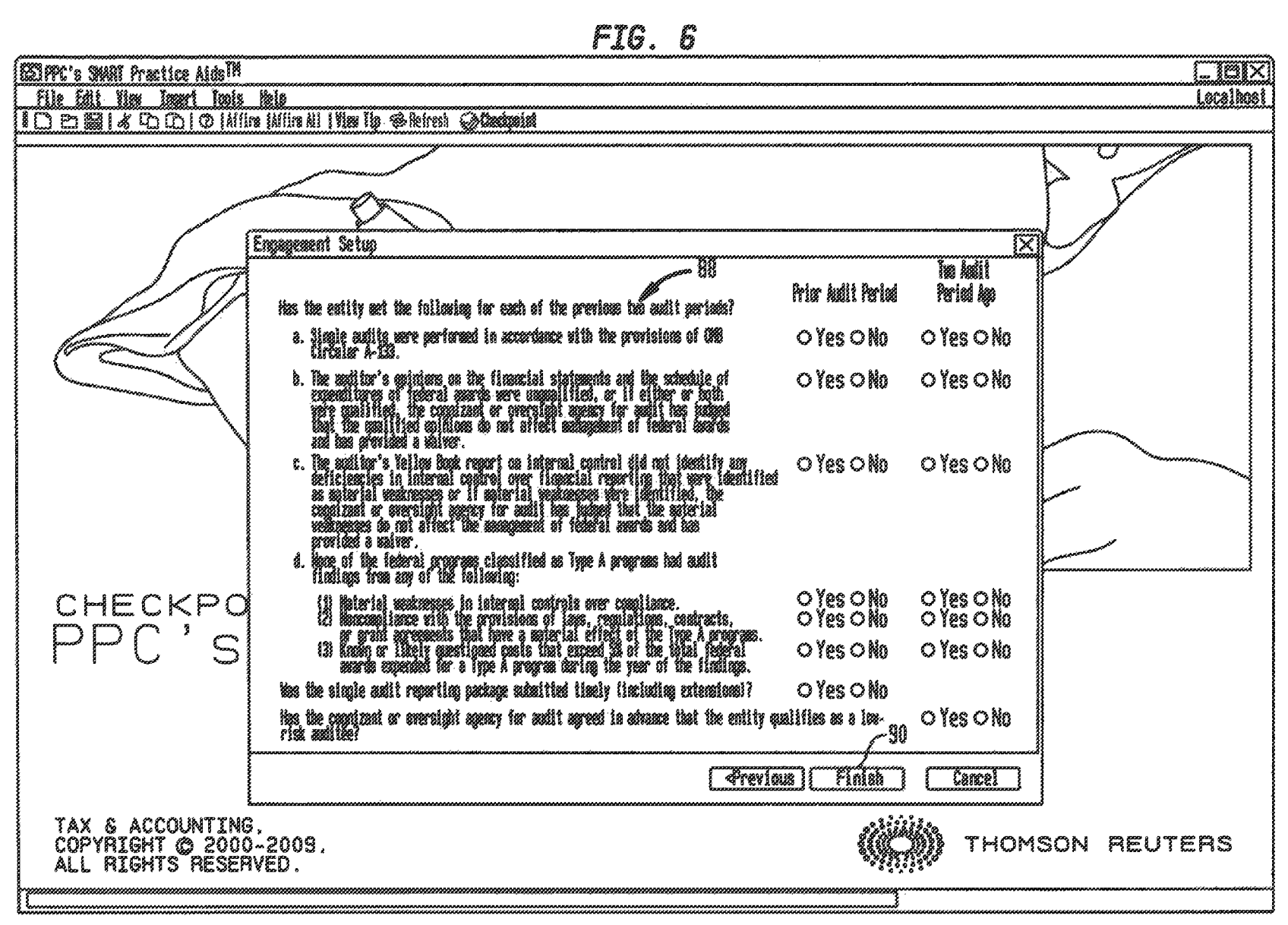

Turning now to FIGS. 5 and 6, in one embodiment, the engagement module 30 is configured to prompt the user with a set of questions 88 associated with different time intervals, the responses to which and are used by the engagement module 30 to determine whether the entity is to be considered a low risk entity or not a low risk entity. As shown in the FIGS. 5 and 6 examples, in one embodiment, the questions presented by the engagement module 30 include, but are not limited to, whether a Single Audit was performed in accordance with provisions of the OMB Circular A-133, whether the auditor's opinion on the financial statements and the schedule of expenditures of federal awards were unqualified, etc. User responses to the set of questions 88 are stored by the engagement module 30 in the data store 40 upon selection of the finish button 90.

Referring now to FIG. 7, a financial awards summary screen 92 provided by the program module 32 is shown. The financial awards summary screen 92 displays information regarding financial awards received and expended by an entity. As shown in FIG. 7, in one embodiment, the financial awards summary screen 92 includes an add program button 94 that allows the user to specify information regarding a funding program.

Figure 8:
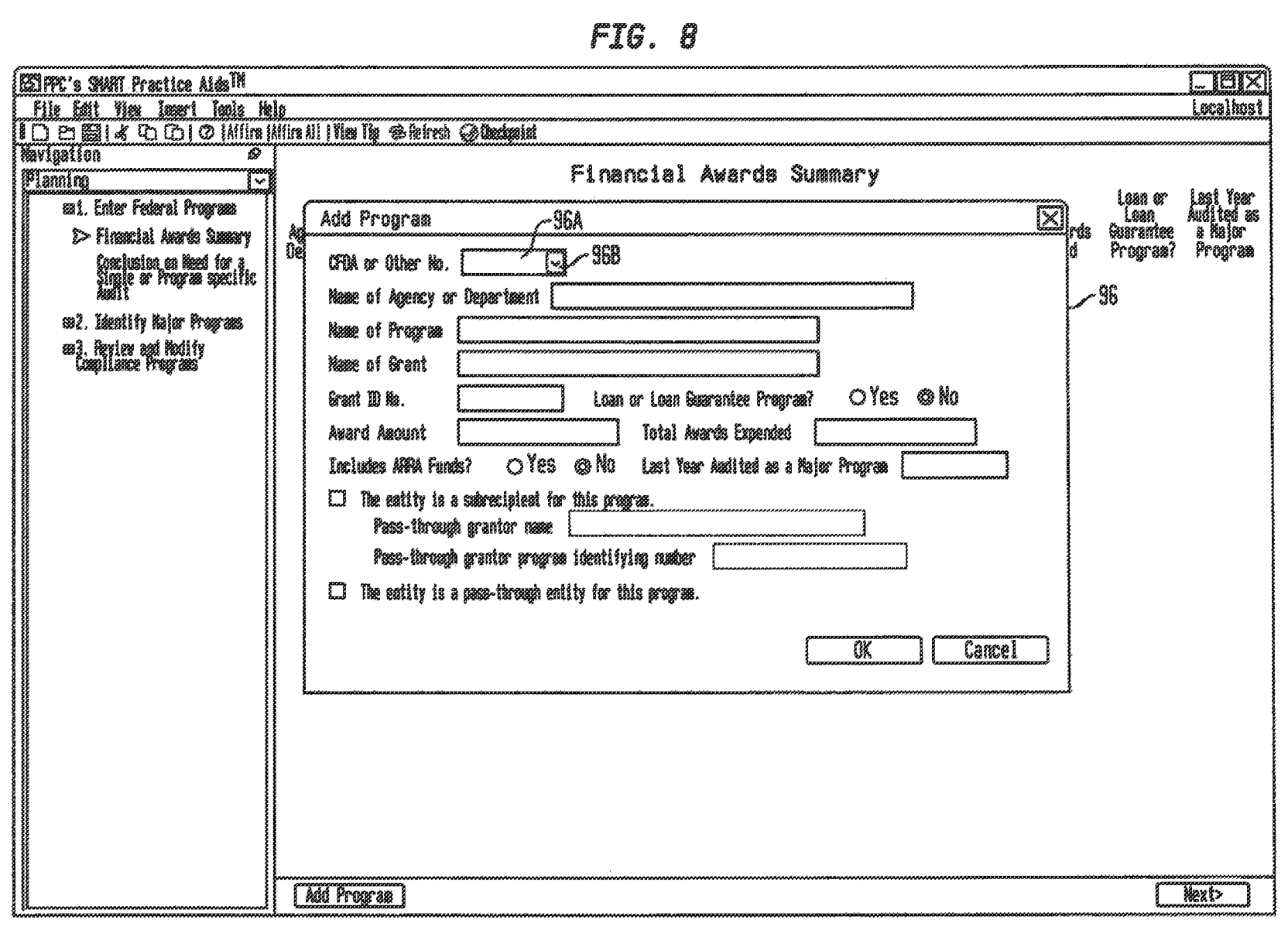
Figure 9:
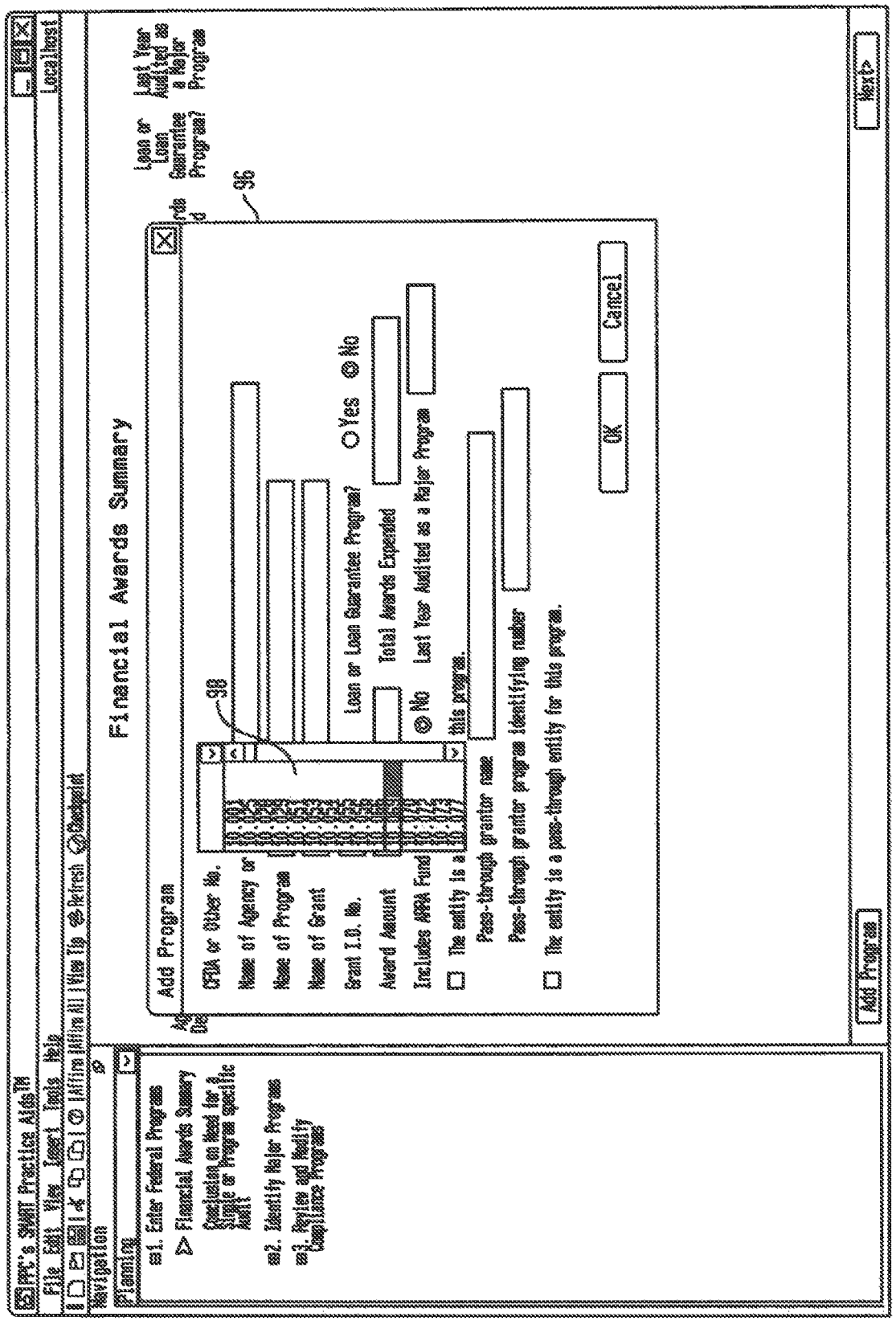

FIG. 8 illustrates an exemplary add program screen 96 provided by the program module 32 to enter information regarding a funding program. As shown in the FIG. 8 example, in one embodiment, the user can either enter a CFDA (Catalog of Federal Domestic Assistance) identifier or other number associated with the funding program 96A, or select a drop-down menu option 96B of CFDA identifiers from a pre-populated list. An example of pre-populated list of CFDA identifiers 98 is shown in FIG. 9.

Figure 10:
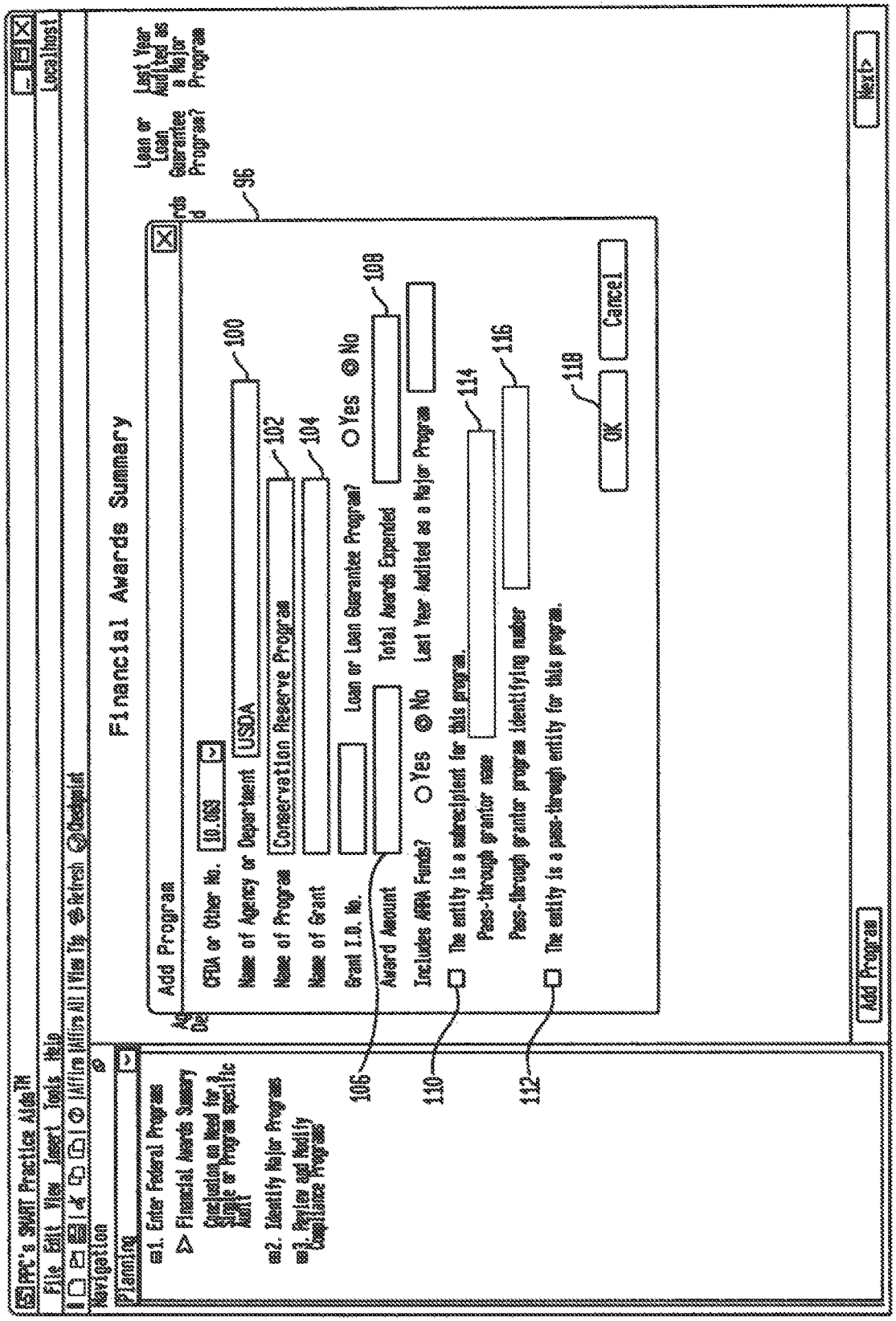
Figure 11:
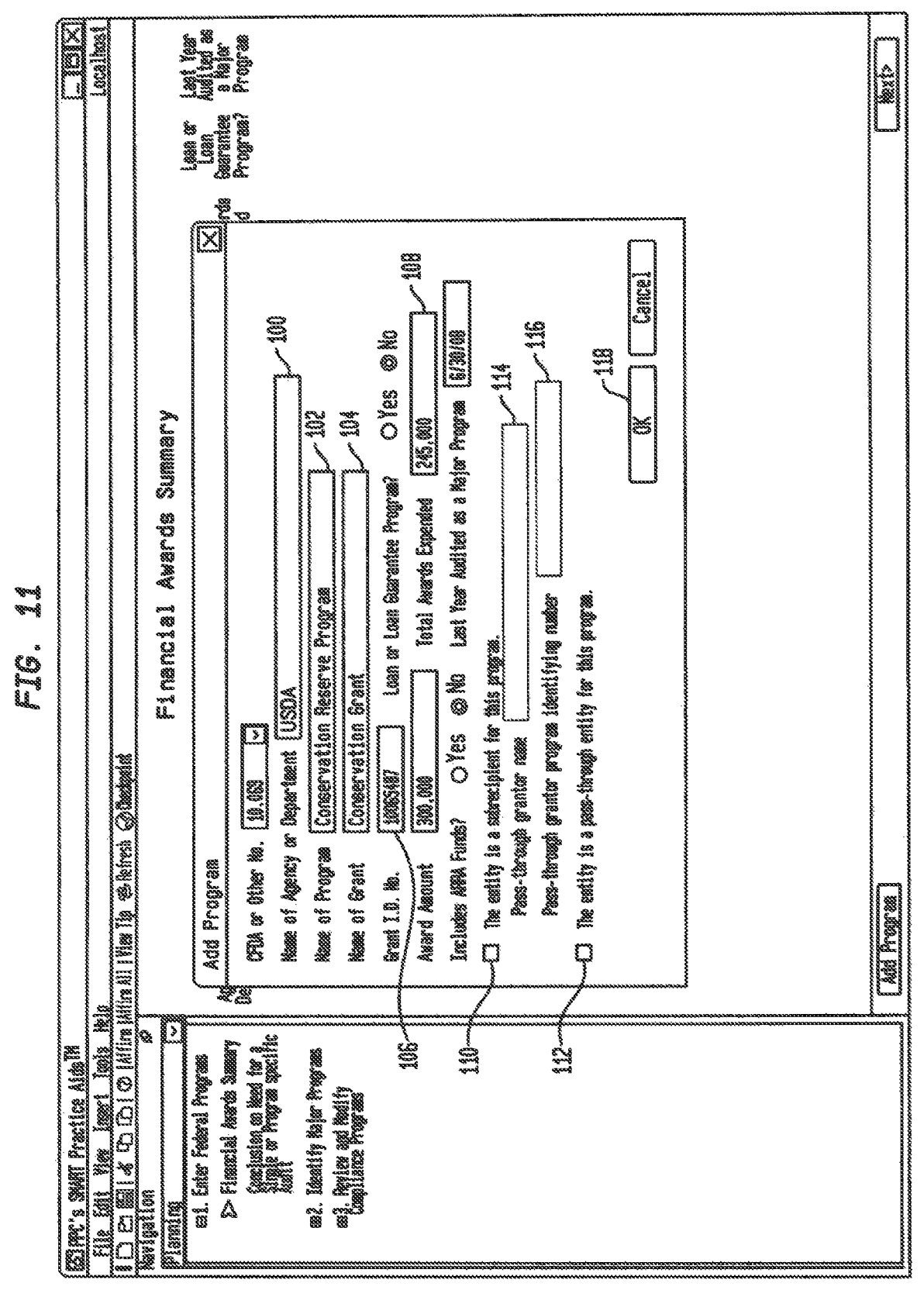

Turning now to FIGS. 10 and 11, if a CFDA identifier from the pre-populated list is selected, agency/department name 100 and program name 102 data entry fields are automatically populated by the program module 32. Other data entry fields include, but are not limited to, name of grant 104, award amount 106 and total awards expended 108. In one embodiment, the add program screen 96 includes checkboxes 110, 112 to indicate whether the entity is a subrecipient (e.g., a non-Federal entity that expends Federal awards received from a pass-through entity to carry out a Federal program), or a pass-through entity (e.g., a non-Federal entity that provides a Federal award to a subrecipient to carry out a Federal program) for the added program. If the entity is not a subrecipient, grantor name 114 and program ID 116 data entry fields are disabled by the program module 32. Upon the user selecting the 'OK' button 118, information entered by the user is stored in the data store 40 and displayed in the financial awards summary screen 92 by the program module 32. FIG. 12 illustrates an example financial awards summary screen for the 'Conservation Reserve Program' funding program.

Turning now to FIG. 13, a financial awards summary screen having a plurality of funding programs identified is shown. As shown in the FIG. 13 example, the program module 32 maintains user entered program information concerning various funding programs. In one embodiment, as shown in FIG. 13, the program module 32 clusters funding programs together. A cluster of programs is a grouping of closely related programs sharing common compliance requirements. There are three types of clusters of programs: research and development, student financial aid, and other clusters, as defined in the OMB Circular A-133 Compliance Supplement or as designated by a state. In the system, a cluster of programs is processed as a single program when determining and testing major programs.

For example, in the example shown in FIG. 13, the program module 32 automatically clustered the 'Rural Rental Housing Loans' 120 and 'Rural Rental Assistance Payments' 122 programs together. Advantageously, by automatically clustering programs together, one set of compliance requirements can be applied by the program module 32 to the cluster without requiring the user to determine which funding programs are closely related.

Figure 14:
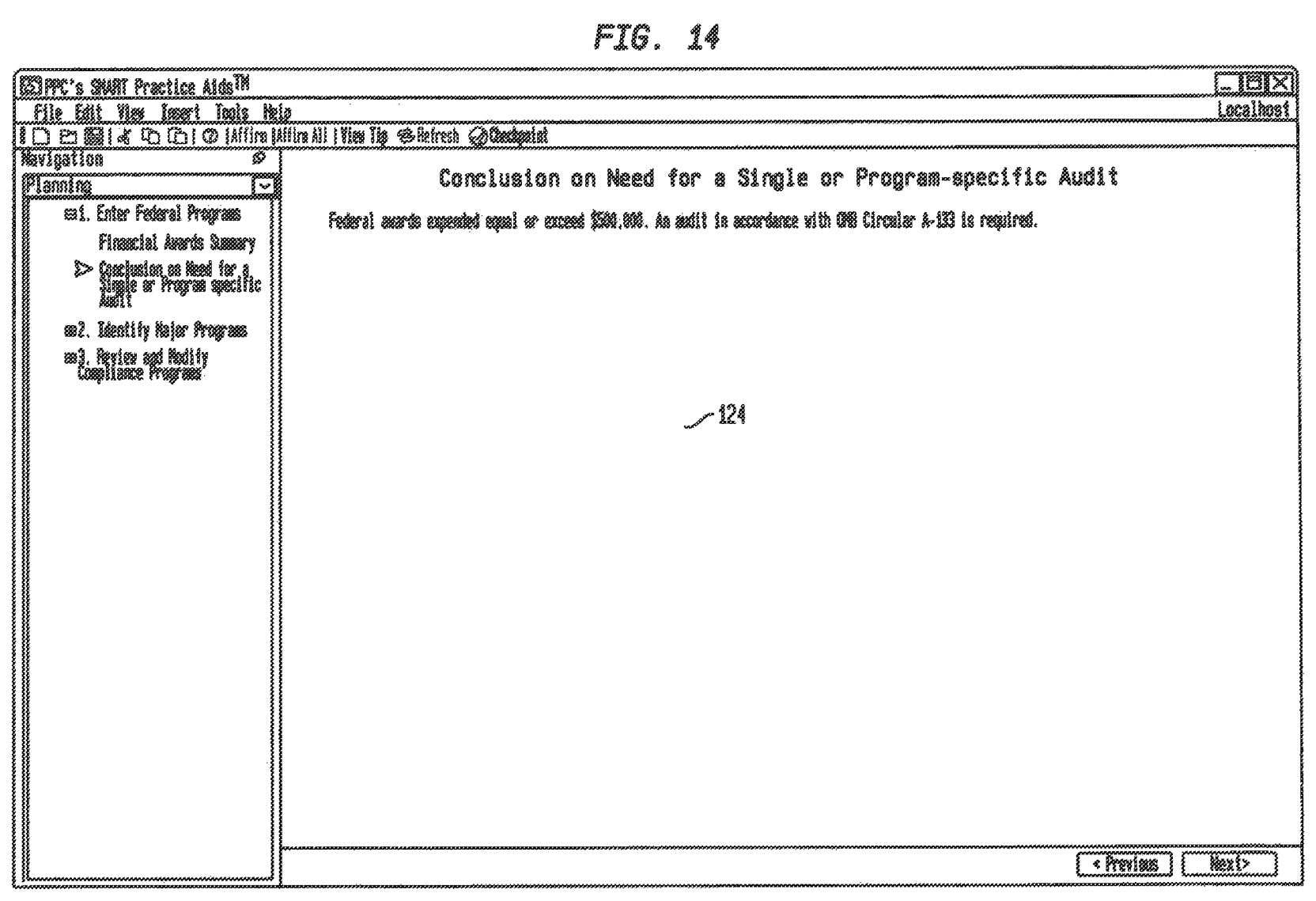

FIG. 14 illustrates an example conclusion screen 124 provided by the program module 32 to the user based on a determination that a Single Audit is to be performed. In one embodiment, rules relating to whether a Single Audit or program-specific audit is to be performed are defined in the before mentioned OMB Circular A-133 and are coded in the program module 32. If the program module 32 determines that a Single Audit is to be performed for the entity, the program module 32 displays a message indicating the same to the user. For example, as shown in FIG. 14, in one embodiment, if federal awards expended equal or exceed five hundred thousand dollars ($500,000), the program module 32 determines that an audit in accordance with OMB Circular A-133 (e.g., Single Audit) is required for the entity.

Figure 15:
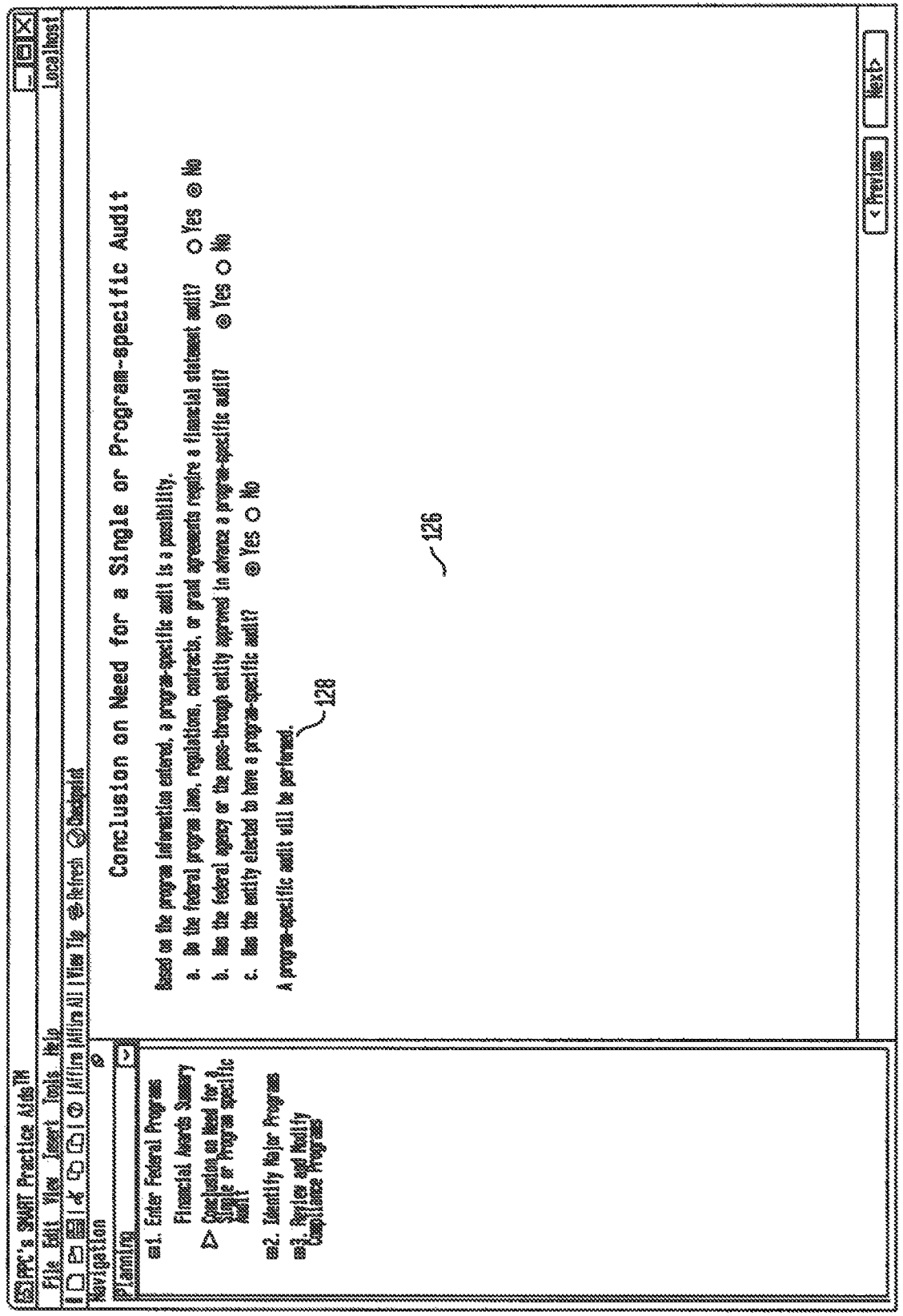

FIG. 15 illustrates an example conclusion screen 126 provided by the program module 32 to indicate that a program-specific audit is a possibility. As described previously, a program-specific audit is an audit of a single funding program, without auditing the entire entity. For example, as shown in FIG. 15, in one embodiment, the conclusion screen 126 presented to the user by the program module 132 includes a set of questions as to whether a program-specific audit is to be performed. In one embodiment, the questions are based on whether federal program laws, regulations, contracts or grant agreements require a financial statement audit, whether the federal agency or a pass-through entity approved in advance a program-specific audit, and whether the entity elected to have a program-specific audit. Based on responses to these additional questions, the program module 32 determines whether a program-specific audit is to be performed and, as shown in FIG. 15, indicates the same 128 on the conclusion screen 126.

Figure 16:
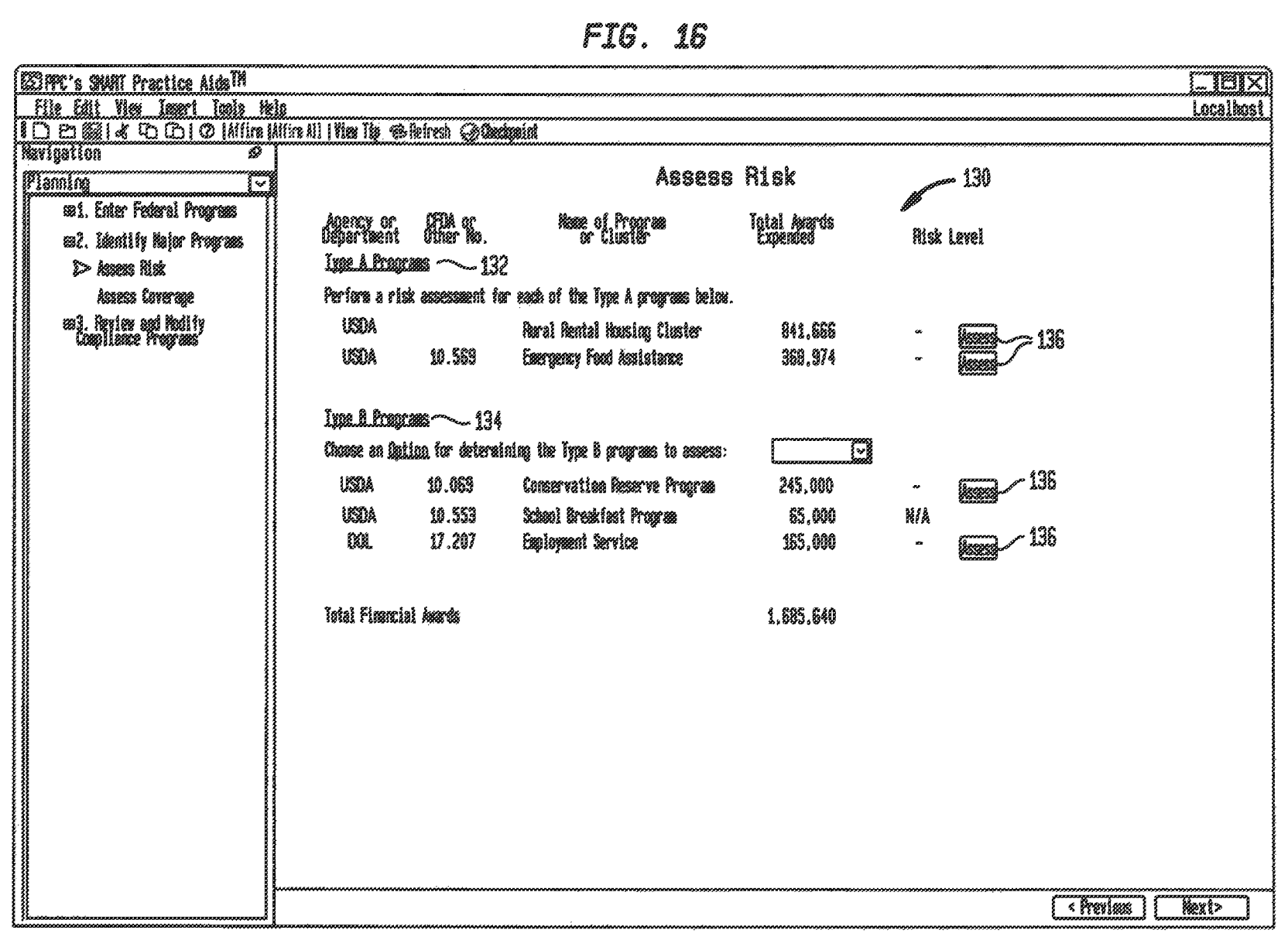

Turning now to FIG. 16, in one embodiment, if the user elects to use risk criteria during the engagement process, the program module 32 provides an assess risk screen 130 to the user. As shown in the FIG. 16 example, the program module 32 automatically classifies identified programs as either Type A programs 132 or Type B programs 134. In one embodiment, for each Type A program identified, the program module 32 provides an associated assess button 136. Upon a user selecting the assess button 136 associated with a Type A program, the program module 32 retrieves and displays a set of questions relating to the particular Type A program to the user (see FIG. 17). Upon entering one or more responses to the set of questions, the program module 32 determines whether the funding program is to be considered low or not low risk.

Figure 17:
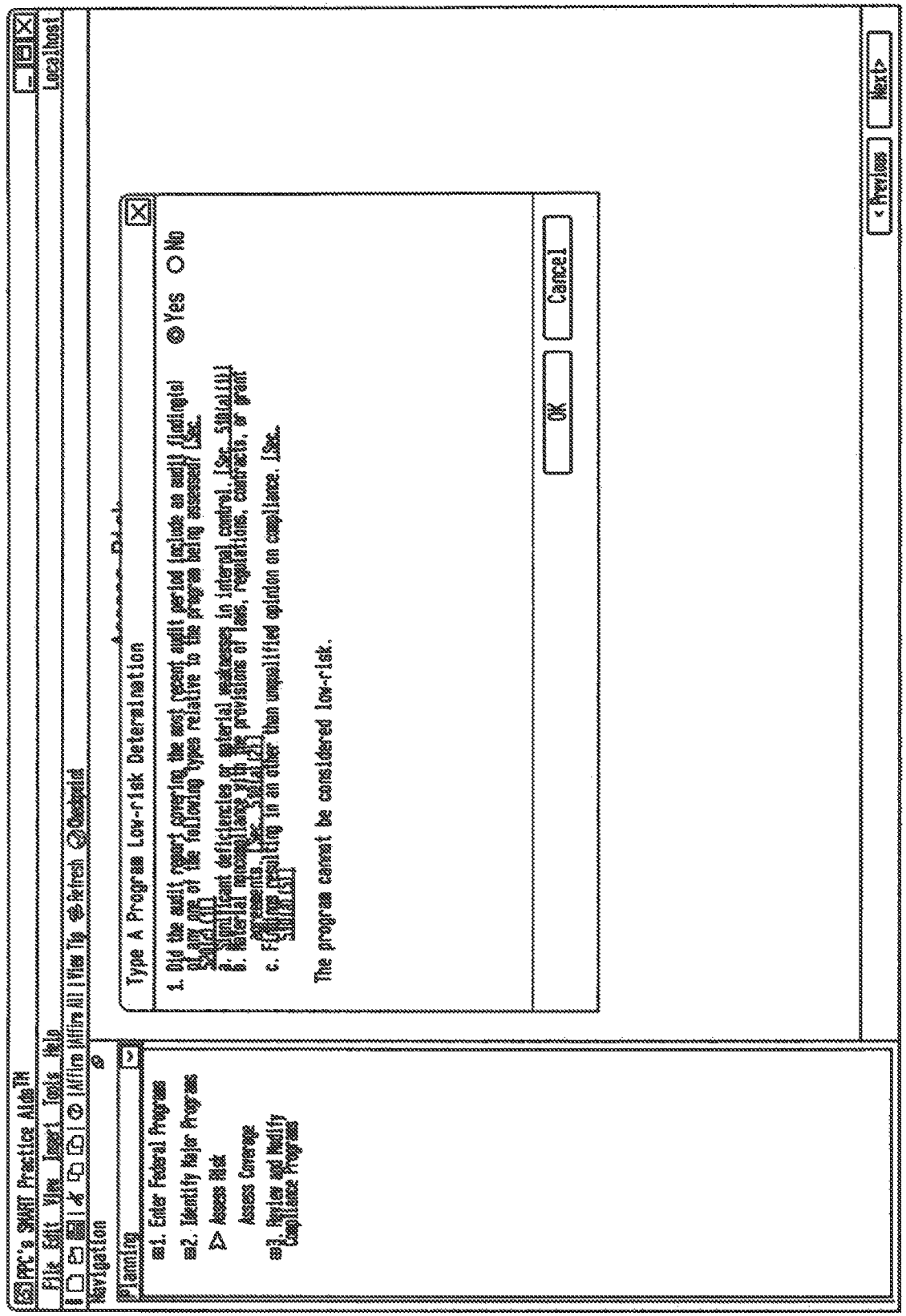

For example, referring to FIG. 17, in one embodiment, upon selection of the assess button 136, the program module 32 displays a Type A Dialog Box 138 to the user that includes questions that are displayed one at a time. When a conclusion can be determined by the program module 32 as to whether the funding program should be considered a low or not low risk, the program module 32 ceases to display any further questions regarding the same and provides a conclusion to the user. If the program module 32 is unable to determine whether the funding program is to be considered a low or not low risk, the program module 32 prompts the user to assess the program as being low or not low risk.

Figure 18:
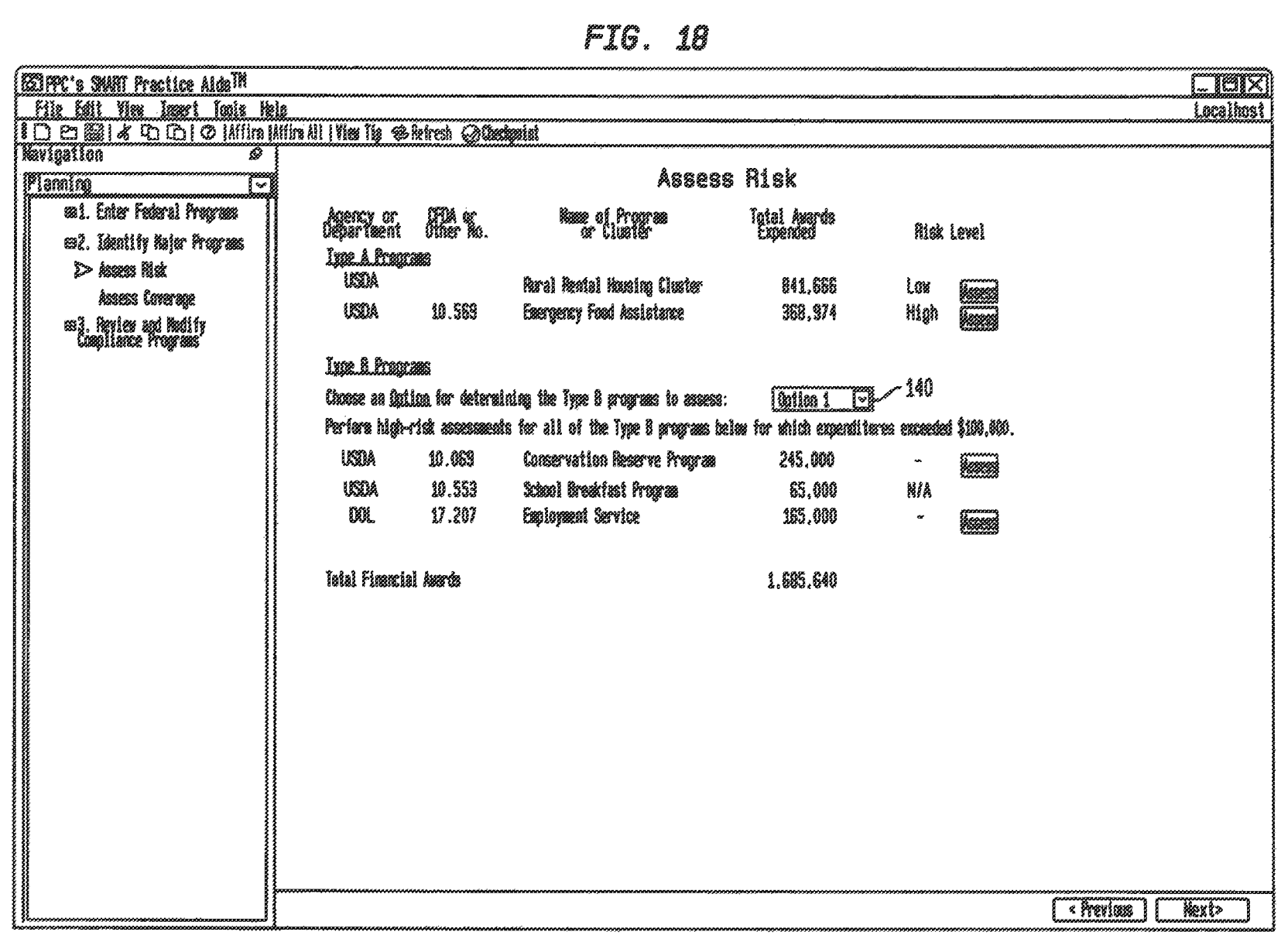

Referring now to FIG. 18, for Type B programs, the program module 32 provides the user with two selectable options for determining the number of Type B programs to assess. As shown in FIG. 18, in one embodiment, upon the user selecting 'Option 1' 140, the user is instructed by the program module 32 to assess risk for all Type B programs that exceed a pre-defined small program amount (e.g., $100,000 dollars). As shown in the FIG. 18 example, all Type B programs are displayed by the program module 32, including those for which risk need not be assessed (e.g., those funding programs that do not exceed the pre-defined small program amount).

Figure 19:
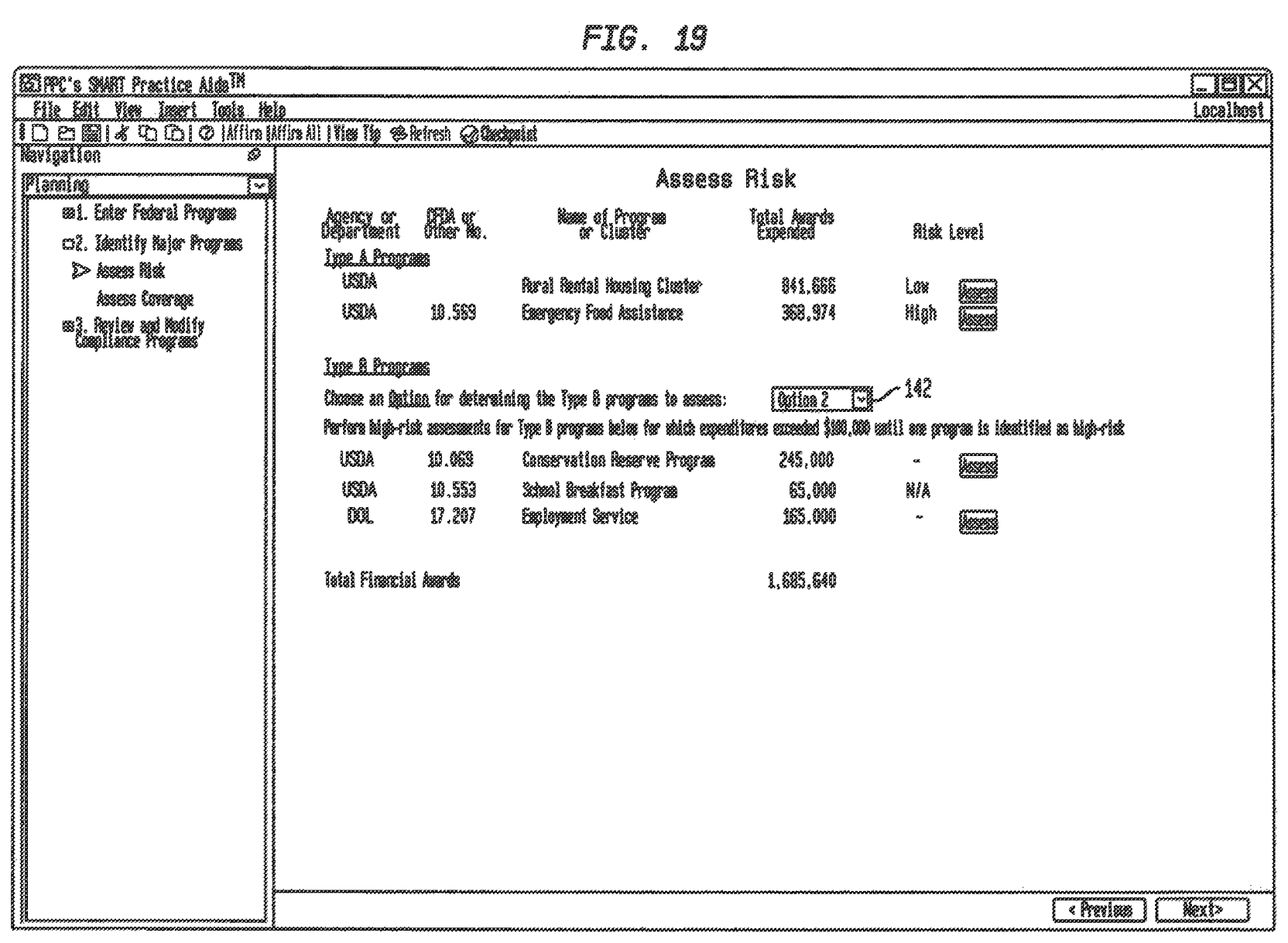

Turning now to FIG. 19, in one embodiment, if the user selects 'Option 2' 142, the program module 32 instructs the user as to how many Type B programs are to be assessed. In one embodiment, the programming logic for determining the required number of programs to be assessed is coded into the program module 32 and defined in OMB Circular A-133.

Figure 20:
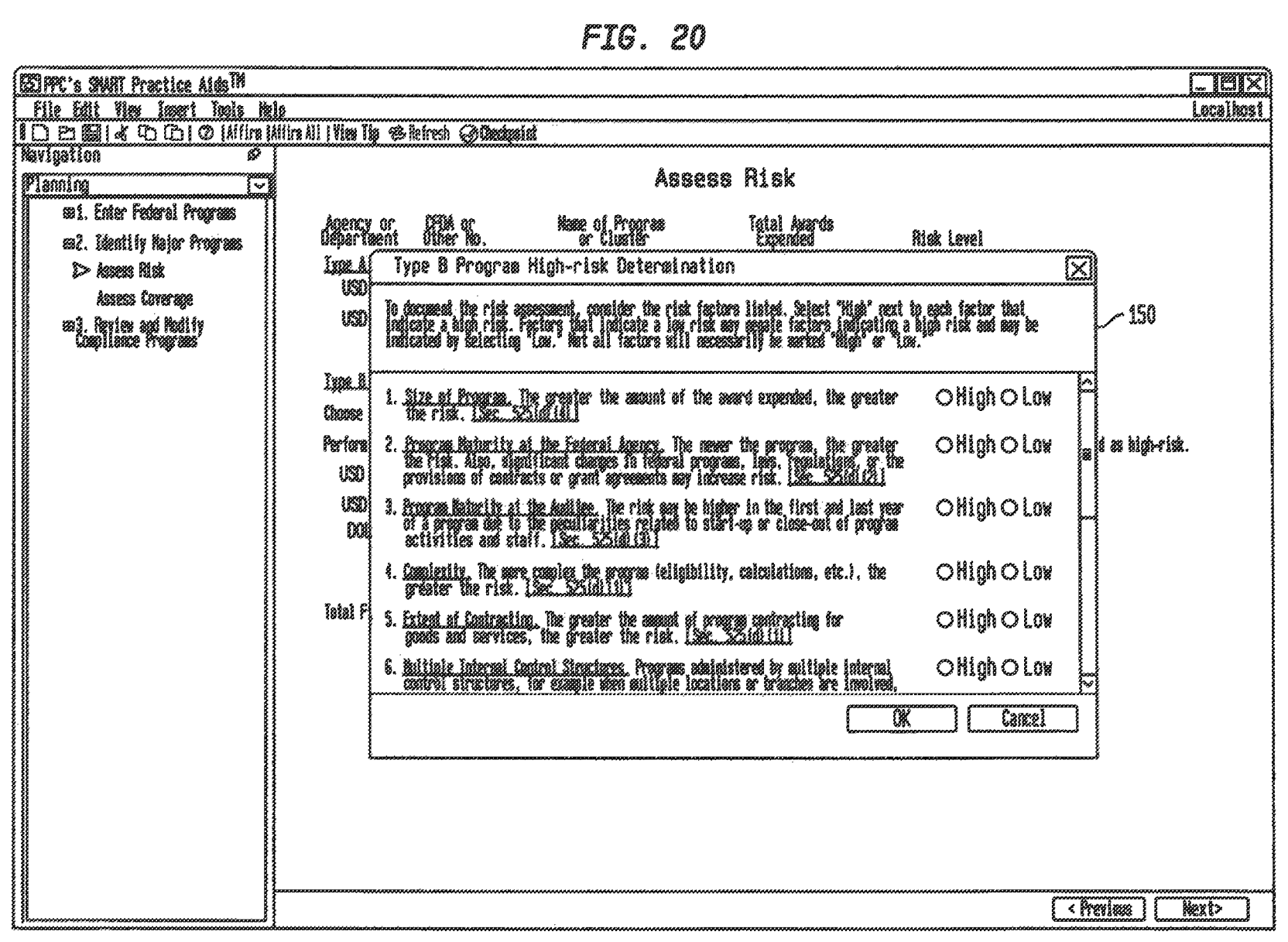

FIG. 20 illustrates an example Type B Dialog Box 150 that is displayed to the user by the program module 32 upon selection of an assess button 136 associated with a Type B program. As shown in the FIG. 20 example, in one embodiment, the program module 32 provides a set of questions relating to assessing Type B programs that are high or not high risk. These questions are different than the set of questions provided by the program module 32 to the user for Type A programs.

In one embodiment, the program module 32 automatically selects the Type B programs to audit as major programs (if possible) or displays a selection screen, as shown in FIG. 25, for the user to select which Type B programs are to be audited as major programs. Once the required number of programs has been assessed, the program module 32 determines whether coverage requirements defined for funding programs have been met.

Coverage requirements relate to government rules that require a specified percentage of received funds to be tested during the Single Audit. For example, a coverage rule may specify that if an entity receives one million dollars ($1,000,000) in federal funds, then at least fifty percent (50%) of the one million dollars ($1,000,000) is to be tested by the user during the Single Audit. In one embodiment, coverage requirements for funding programs are defined in OMB Circular A-133.

Figure 21:
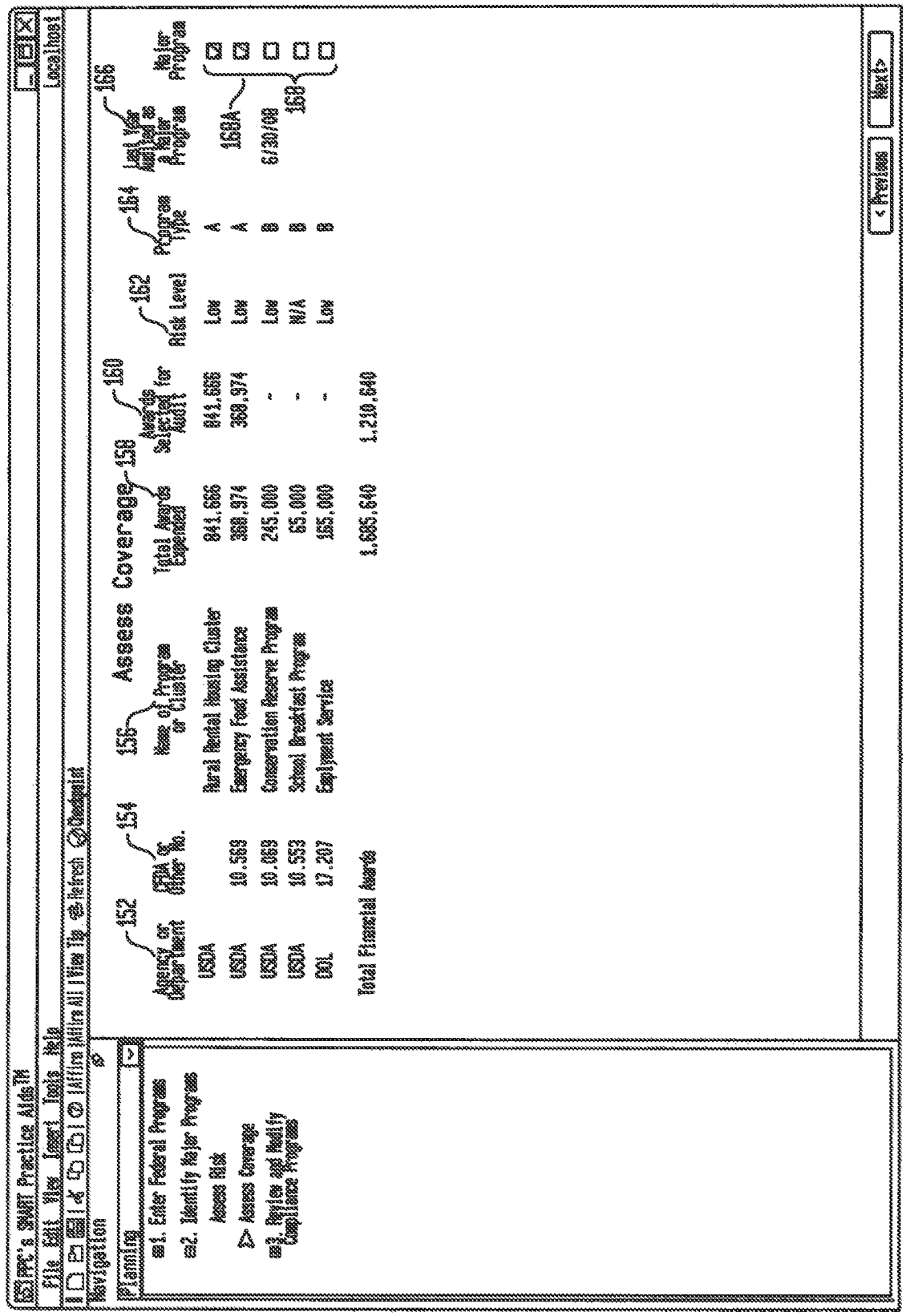

FIG. 21 illustrates an example assess coverage screen 151 provided by the coverage module 32. As shown in FIG. 21, in one embodiment, the program module 32 displays for each program or cluster previously identified an agency/department identifier 152, a CFDA or other number 154, a program/cluster name 156, total awards expended 158, an amount of awards selected for audit 160, risk level for the program/cluster 162, program type 164, date of last year audited as a major program 166, and checkboxes 168 indicating whether each program is considered a Type A or Type B program. As shown in FIG. 21, in one embodiment, funding programs identified as major programs based on previous user data entry are automatically checked and disabled 168A by the program module 32 on the assess coverage screen 151. The program module 32 assesses coverage regardless of whether the user elected to waive use of risk criteria during the engagement setup.

Figure 22:
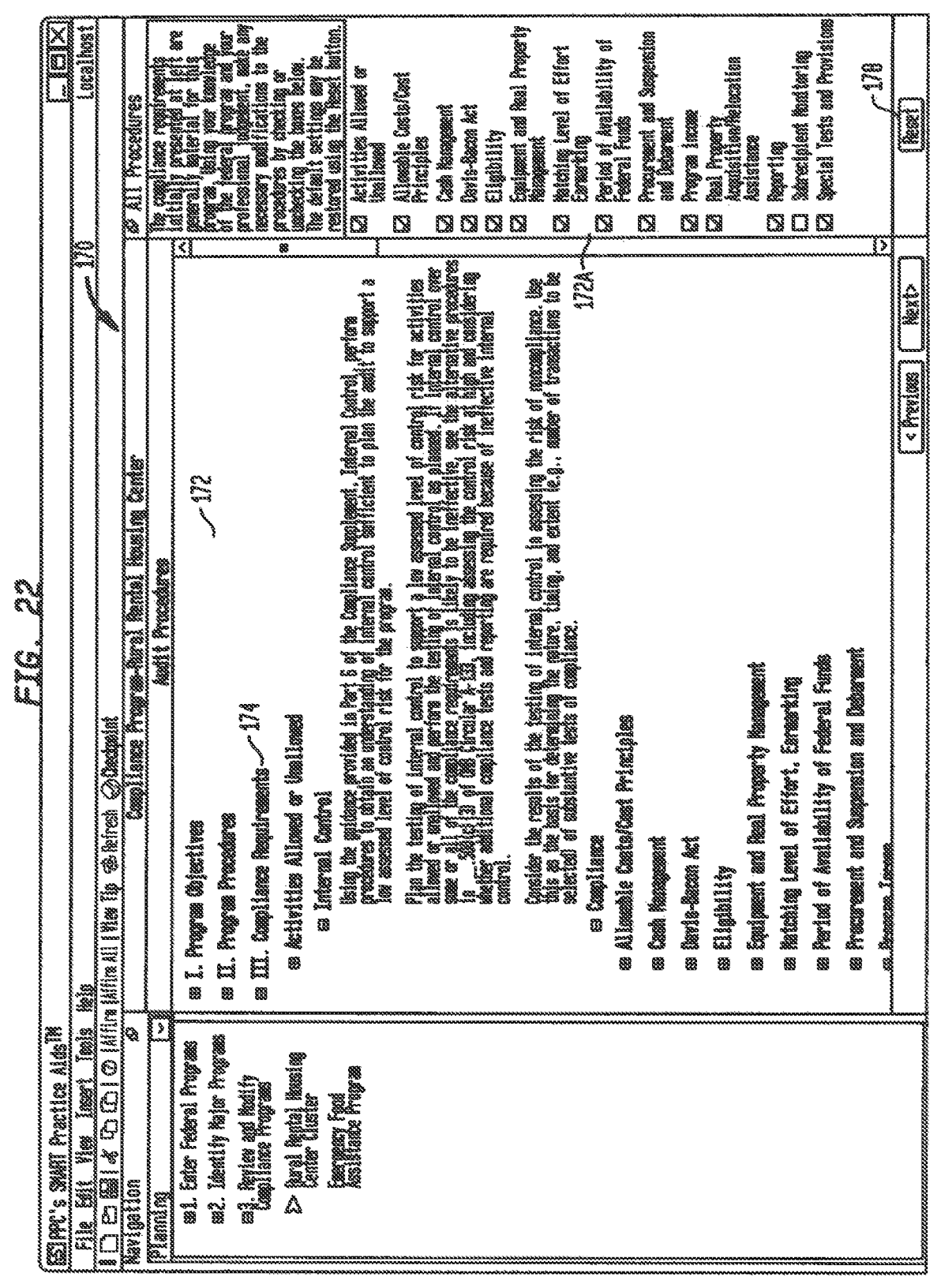

In one embodiment, the program module 32 displays a warning message (not shown) to the user if the coverage required for a program is not met. The coverage percentage used is based on the low risk/not low risk entity questions prompted during the engagement setup by the engagement module 30. For example, in one embodiment, the program module 32 generates a warning message including a calculation of the additional amount of award expenditures that needs to be tested in order to be in compliance with funding program rules and regulations. The computed amount is updated by the program module 32 as the major program checkboxes 168 are selected and deselected. In one embodiment, the user is allowed to select additional programs to be audited as major programs until the coverage requirement is met. Referring now to FIG. 22, a compliance screen 170 provided by the compliance module 34 is shown. The compliance screen 170 displays a compliance program 172 determined by the compliance module 34 for one or more identified funding programs. In one embodiment, as shown in FIG. 22, the compliance program 172 includes one or more compliance requirements 174 that are automatically selected by the compliance module 34 from a Compliance Supplement based on funding programs selected and assessed by the user.

As shown in FIG. 22, in one embodiment, each section of the compliance requirements 174 collapses and expands to help users navigate to various parts of the compliance program efficiently. In addition, the compliance module 34 provides users with the ability to add and delete compliance requirements.

For example, as shown in the FIG. 22 example, in one embodiment, the right hand pane 172A of the compliance program screen 170 includes a list of all compliance requirements determined automatically by the compliance module 34. The compliance module 34 automatically selects the compliance requirements applicable to one or more major programs and adds the same in the compliance program 172. Compliance requirements not included in the compliance program 172 are automatically deselected from the right pane 172A.

The compliance module 34 provides users with the ability to add and delete compliance requirements by selecting and unselecting the checkboxes in the right pane 172A. As shown in FIG. 22, in one embodiment, the compliance module 34 also provides the user with a reset button 178 that allows the user to restore the compliance program 172 to original selections generated by the compliance module 34. In another embodiment, the compliance module 34 allows the user to comment on rationale used in their selections of compliance requirements, which are then stored by the compliance module 34 in the data store 40. If the award is not in the Compliance Supplement, the application guides the user in selecting and deselecting compliance requirements as described above by providing the user with tailoring procedures. The user may customize the compliance procedures in the middle pane by adding, deleting, and/or modifying a procedure automatically selected by the system or selected by the user.

Figure 23:
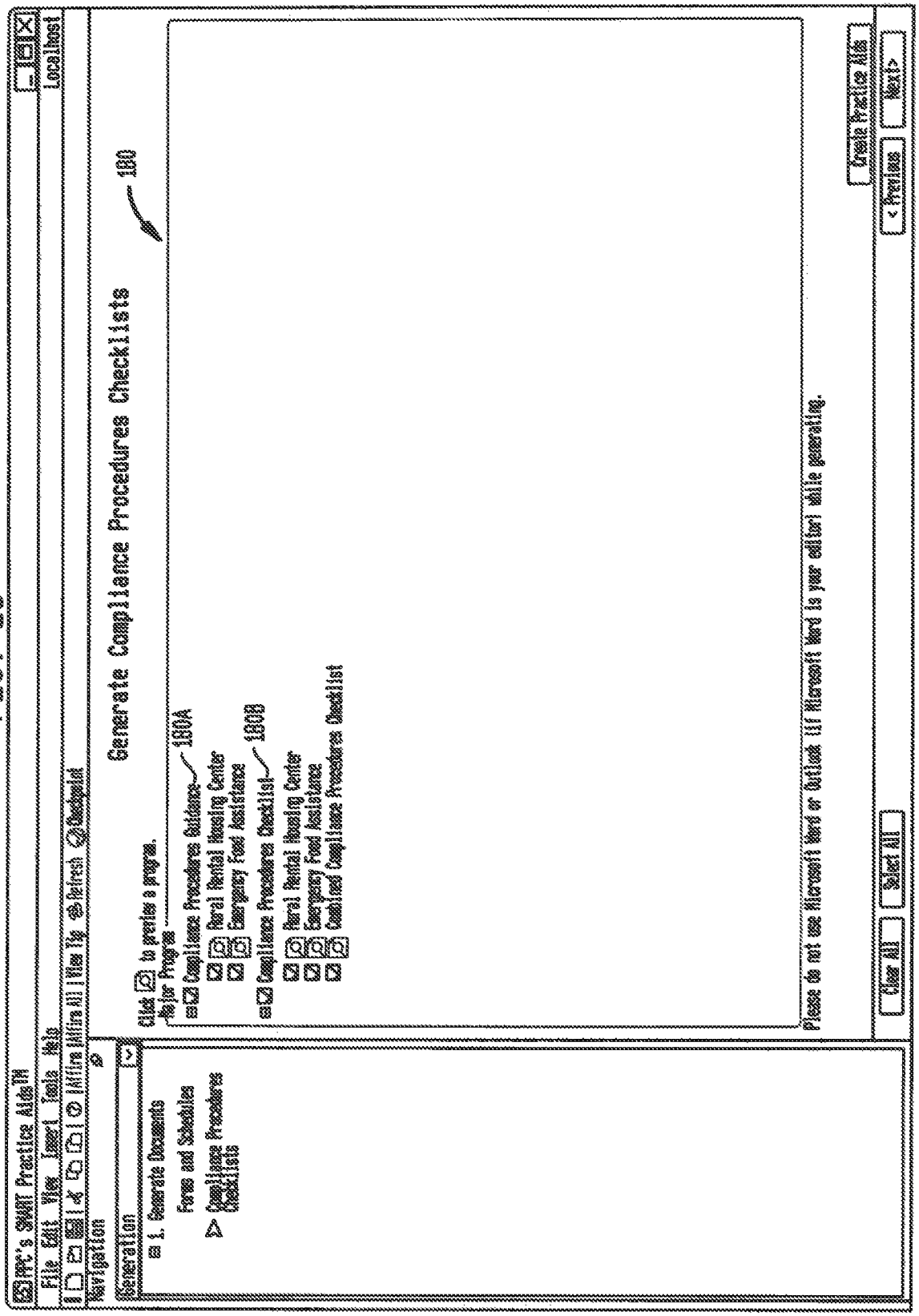
Figure 24:
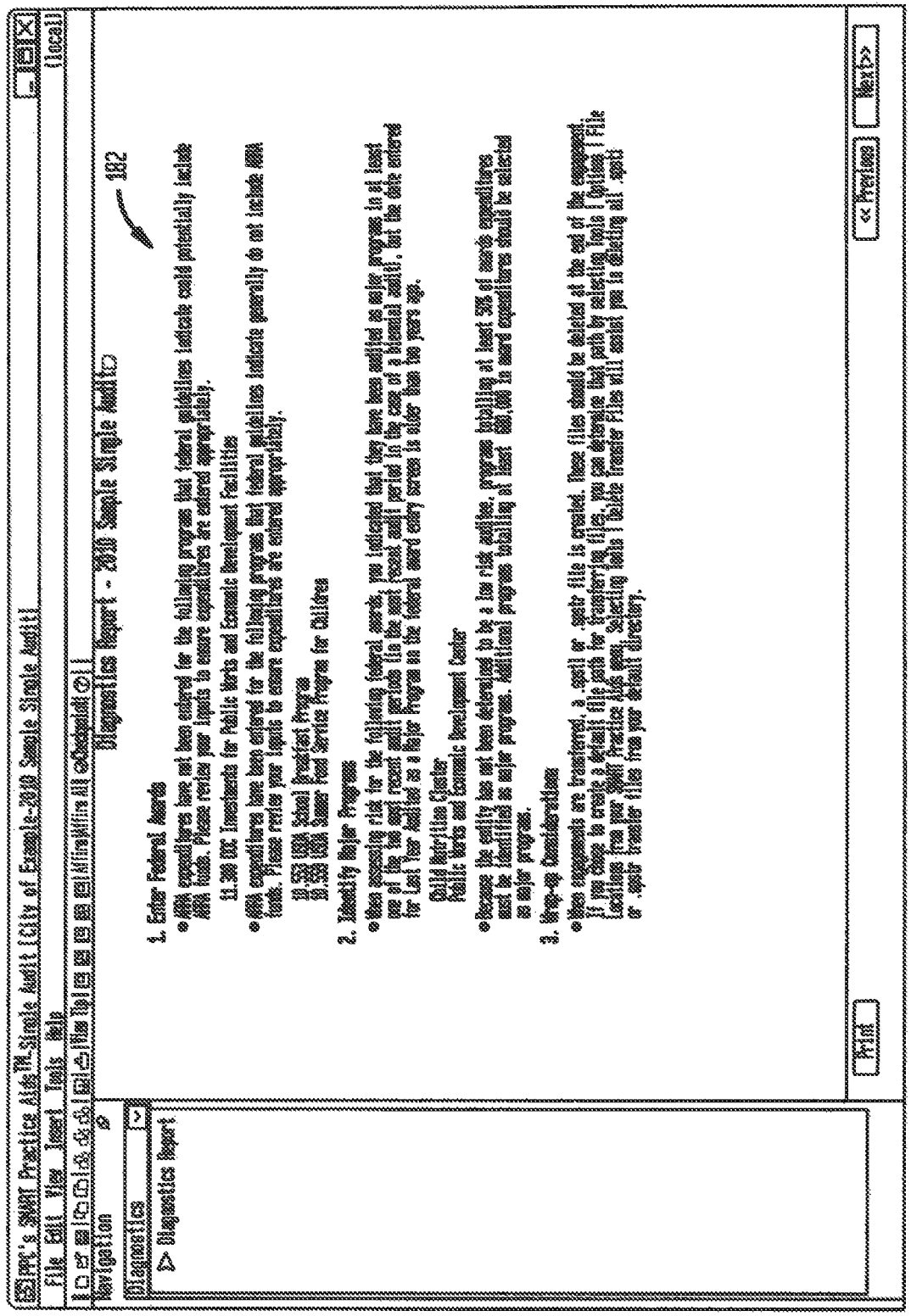
FIG. 24 illustrates an exemplary graphical user interface for displaying a diagnostic report associated with a Single Audit.

FIG. 23 illustrates a compliance checklist screen 180 that is provided by the compliance module 134. In one embodiment, the compliance module 34 is configured to compute a schedule of expenditures of federal awards and a series of user selectable worksheets to guide the user through the examination stage. For example, as shown in FIG. 23, in one embodiment, upon selecting one or more compliance procedure guidelines 180A and checklists 180B, the compliance module 34 generates a single document containing textual guidance (e.g., guidance that is unique to the program and guidance that is common to all programs), and another document containing only procedural checklists that can be used during the examination stage. Background guidance and procedure checklists can be generated in MS Word® format or a plurality of other standard document formats specified by the user.

Once checklists are generated, the user conducts the audit by examining files, documents, contracts, checks, etc. of the entity. The user may investigate, to some degree, transactions between the funding program and other parties. Results are then compared with items identified in one or more checklists to determine if the entity is in compliance or not with funding program rules and procedures.

Turning now to FIG. 24, a display screen comprising a diagnostic report 182 generated by the diagnostic module 36 for a Single Audit is shown. The diagnostic module 36 is configured to provide guidance to the user as well as determine whether there are any possible errors and/or inconsistencies with user-entered responses to questions that could and/or would affect the quality of the audit. As shown in the FIG. 24 example, in one embodiment, the diagnostic report 182 relates to, but is not limited to, entered federal award information, major program determination, as well as the transfer of engagements between users. In another embodiment, the diagnostic module 36 performs tests of transactions and account balances to ensure that information presented in financial statements and notes thereof are accurate.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method for planning an audit for an entity, the method carried out under the control of one or more computer systems configured with executable instructions and comprising:

determining, using an engagement module of a web server, an audit risk level for the entity;

determining, using a program module of the web server, whether a Single Audit of the entity is to be performed based at least in part on a financial award received by the entity exceeding a first threshold value and on first information, wherein the financial award is associated with at least one funding program and the first information includes information specific to the entity and to the at least one funding program, wherein said information specific to the entity is determined from one or more user responses to a first set of questions provided through a graphical user interface, said one or more user responses to the first set of questions are directed to the entity's audit history;

if the financial award received by the entity does not exceed the first threshold level, determining, using the program module of the web server, whether a program-specific audit is to be performed for the entity based at least on second information related to the at least one funding program;

determining, using the program module of the web server, whether the at least one funding program is to be evaluated as a major program at least in part by assessing risk and coverage information associated with the financial award and the entity, said risk and coverage information comprising audit experience, degree of oversight exercised by a government entity and presence of fraud and determined from one or more user responses to a second set of questions provided through a graphical user interface, said determining of the at least one funding program as a major program further comprising:

determining that a set of common compliance requirements apply to the at least one funding program;
    identifying other funding programs for which the set of common compliance requirements also applies;
    clustering the at least one funding program and the other funding programs together into a cluster of funding programs based on the set of common compliance requirements; and
    processing the cluster of funding programs as a single funding program;

automatically determining, using a compliance module of the web server, at least one compliance procedure from a plurality of compliance procedures for use during the Single Audit or the program-specific audit, said determining of the at least one compliance procedure for use based on at least the determined audit risk level and the determined funding program evaluation;

customizing the at least one compliance procedure, wherein customizing the at least one compliance procedure includes adding, deleting, or modifying the at least one compliance procedure;

providing the at least one compliance procedure to conduct the Single Audit or the program-specific audit;

automatically determining, using a diagnostic module of the web server, at least one of an inconsistency, error and missing response from the one or more user responses to the first set of questions and the one or more user responses to the second set of questions; and providing a diagnostic report outlining the determined one or more inconsistencies, errors and missing responses from the one or more user responses to the first set of questions and the one or more user responses to the second set of questions.

2. The method of claim 1, further comprising conducting the Single Audit or the program-specific audit using the at least one compliance procedure.

3. The method of claim 1, wherein conducting the Single Audit or the program-specific audit comprises documenting the Single Audit or the program-specific audit.

4. The method of claim 1, wherein the entity-specific information comprises information describing a type of entity, the type of entity selected from the group consisting of "Local Government", "Local Education Agency", "Indian Tribal Government", "State Government", "State Education Agency", "Nonprofit Organization", or combinations thereof.

5. The method of claim 1, further comprising the step of categorizing the at least one funding program, the categorizing based at least in part on the amount of expenditures by the entity, and wherein determining whether the funding program is to be evaluated as a major program comprises analyzing whether the funding program qualifies as a 'Type A' program or a 'Type B' program.

6. The method of claim 1, further comprising the step of:
  automatically selecting the at least one compliance procedure to be used during the Single Audit or the program-specific audit.

7. The method of claim 6, wherein automatically selecting the at least one compliance procedure is based on a Compliance Supplement.

8. The method of claim 6, wherein automatically selecting the at least one compliance procedure is based on the financial award and the funding program.

9. The method of claim 6, wherein automatically selecting the at least one compliance procedure is based on the financial award, the funding program, and the entity-related information.

10. The method of claim 6, wherein automatically selecting the at least one compliance procedure is based on the financial award, the funding program, the entity-related information, and risk and coverage information.

11. The method of claim 1, further comprising the step of: enabling selection by a user of the at least one compliance procedure to be used during the Single Audit or the program-specific audit.

12. The method of claim 11, wherein enabling selection of the at least one compliance procedure is based on a Compliance Supplement.

13. The method of claim 11, wherein enabling selection of the at least one compliance procedure is based on the financial award and the funding program.

14. The method of claim 11, wherein enabling selection of the at least one compliance procedure is based on the financial award, the funding program, and the entity-related information.

15. The method of claim 11, wherein enabling selection of the at least one compliance procedure is based on the financial award, the funding program, the entity-related information, and risk and coverage information.

16. A system comprising:
  a server including a processor and memory storing instructions that, in response to receiving a request for access to a service, cause the processor to:
    determine, using an engagement module of a web server, an audit risk level for the entity;

determine, using a program module of the web server, whether a Single Audit of the entity is to be performed based at least in part on a financial award received by the entity exceeding a first threshold value and on first information, wherein the financial award is associated with at least one funding program and the first information includes information specific to the entity and to the at least one funding program, wherein said information specific to the entity is determined from one or more user responses to a first set of questions provided through a graphical user interface, said one or more user responses to the first set of questions are directed to the entity's audit history;

if the financial award received by the entity does not exceed the first threshold level, determining, using the program module of the web server, whether a program-specific audit is to be performed for the entity based at least on second information related to the at least one funding program;

determine, using the program module of the web server, whether the at least one funding program is to be evaluated as a major program at least in part by assessing risk and coverage information associated with the financial award and the entity, said risk and coverage information comprising audit experience, degree of oversight exercised by a government entity and presence of fraud and determined from one or more user responses to a second set of questions provided through a graphical user interface, said instructions to determining of the at least one funding program as a major program further comprising instruction to:

determine that a set of common compliance requirements apply to the at least one funding program;
identify other funding programs for which the set of common compliance requirements also applies;
cluster the at least one funding program and the other funding programs together into a cluster of funding programs based on the set of common compliance requirements; and
process the cluster of funding programs as a single funding program;

automatically determine, using a compliance module of the web server, at least one compliance procedure from a plurality of compliance procedures for use during the Single Audit or the program-specific audit, said determining of the at least one compliance procedure for use based on at least the determined audit risk level and the determined funding program evaluation;

customize the at least one compliance procedure, wherein customizing the at least one compliance procedure includes adding, deleting, or modifying the at least one compliance procedure;

provide the at least one compliance procedure to conduct the Single Audit or the program-specific audit;

automatically determine, using a diagnostic module of the web server, at least one of an inconsistency, error and missing response from the one or more user responses to the first set of questions and the one or more user responses to the second set of questions; and provide a diagnostic report outlining the determined one or more inconsistencies, errors and missing responses from the one or more user responses to the first set of questions and the one or more user responses to the second set of questions.

17. The system of claim 16, further comprising conducting the Single Audit or the program-specific audit using the at least one compliance procedure.

18. The system of claim 16, wherein conducting the Single Audit or the program-specific audit comprises documenting the Single Audit or the program-specific audit.

19. The system of claim 16, wherein the entity-specific information comprises information describing a type of entity, the type of entity selected from the group consisting of "Local Government", "Local Education Agency", "Indian Tribal Government", "State Government", "State Education Agency", "Nonprofit Organization", or combinations thereof.

20. The system of claim 16, further comprising the step of categorizing the at least one funding program, the categorizing based at least in part on the amount of expenditures by the entity, and wherein determining whether the funding program is to be evaluated as a major program comprises analyzing whether the funding program qualifies as a 'Type A' program or a 'Type B' program.

21. The system of claim 16, further comprising the step of automatically selecting the at least one compliance procedure to be used during the Single Audit or the program-specific audit.

22. The system of claim 21, wherein automatically selecting the at least one compliance procedure is based on a Compliance Supplement.

23. The system of claim 21, wherein automatically selecting the at least one compliance procedure is based on the financial award and the funding program.

24. The system of claim 21, wherein automatically selecting the at least one compliance procedure is based on the financial award, the funding program, and the entity-related information.

25. The system of claim 21, wherein automatically selecting the at least one compliance procedure is based on the financial award, the funding program, the entity-related information, and risk and coverage information.

26. The system of claim 16, further comprising the step of enabling selection by a user of the at least one compliance procedure to be used during the Single Audit or the program-specific audit.

27. The system of claim 26, wherein enabling selection of the at least one compliance procedure is based on a Compliance Supplement.

28. The system of claim 26, wherein enabling selection of the at least one compliance procedure is based on the financial award and the funding program.

29. The system of claim 26, wherein enabling selection of the at least one compliance procedure is based on the financial award, the funding program, and the entity-related information.

30. The system of claim 26, wherein enabling selection of the at least one compliance procedure is based on the financial award, the funding program, the entity-related information, and risk and coverage information.

31. A system for planning an audit comprising:
a data store comprising a plurality of compliance procedures;
a server operatively coupled to the data store, the server including a processor and memory storing instructions that, in response to receiving a first request for access to a service, cause the processor to:
determine, using an engagement module of a web server, an audit risk level for the entity;

provide a first set of questions and a second set of questions to an entity provided through a graphical user interface;

determine, using a program module of the web server, whether a Single Audit or a program-specific audit is to be performed for the entity based on a response to the first set of questions, said first set of questions are directed to inquiring as to the entity's audit history;

determine, using the program module of the web server, whether a funding program associated with a financial award received by the entity is to be evaluated as a major program based on a response to the second set of questions, wherein the instructions to cause the processor to determine whether the funding program associated with the financial award received by the entity is to be evaluated as a major program includes instructions to cause the processor to:

determining that a set of common compliance requirements apply to the at least one funding program;

identifying other funding programs for which the set of common compliance requirements also applies;

clustering the at least one funding program and the other funding programs together into a cluster of funding programs based on the set of common compliance requirements; and processing the cluster of funding programs as a single funding program;

determine, using a program module of the web server, whether the entity is low risk or not low risk;

select automatically, using a compliance module of the web server, at least one compliance procedure from the plurality of compliance procedures to be used during the Single Audit or the program-specific audit;

customize the at least one compliance procedure, wherein customizing the at least one compliance procedure includes adding, deleting, or modifying the at least one compliance procedure;

automatically determine at least one of an inconsistency, error and missing response from the one or more user responses to the first set of questions and the one or more user responses to the second set of questions;

provide a diagnostic report outlining the determined one or more inconsistencies, errors and missing responses from the one or more user responses to the first set of questions and the one or more user responses to the second set of questions;

generate a signal associated with the at least one compliance procedure and the diagnostic report; and transmit the signal.

32. The system of claim 31, wherein the memory stores instructions that, in response to receiving the first request, cause the processor to display the first set of questions, the second set of questions, or combinations thereof, on a display device.

33. The system of claim 31, wherein the at least one compliance procedure is based on a Compliance Supplement.

34. The system of claim 31, wherein the first set of questions are entity-related questions.

35. The system of claim 31, wherein the second set of questions relates to risk and coverage information associated with the funding program.

36. The system of claim 31, wherein the memory stores instructions that, in response to receiving the first request, causes the processor to: select automatically or enable selection of the at least one compliance procedure based at least in part on the clustering.

37. The system of claim 31, wherein the at least one compliance procedure is based on at least the financial award.

38. The system of claim 31, wherein the at least one compliance procedure is based on the financial award and the funding program.

39. The system of claim 31, wherein the at least one compliance procedure is based on the financial award, the funding program, and the entity-related information.

40. The system of claim 31, wherein the at least one compliance procedure is based on the financial award, the funding program, the entity-related information, and risk and coverage information.

41. The system of claim 31, wherein the memory stores instructions that, in response to receiving the first request, cause the processor to analyze whether the funding program qualifies as a 'Type A' program or a 'Type B' program.

\* \* \* \* \*